United States Patent
Higaki et al.

(10) Patent No.: US 7,980,232 B2
(45) Date of Patent: Jul. 19, 2011

(54) FOUR STROKE INTERNAL COMBUSTION ENGINE

(75) Inventors: Yoshiyuki Higaki, Iwata (JP); Osamu Takii, Iwata (JP); Hirofumi Serikawa, Iwata (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 404 days.

(21) Appl. No.: 12/359,862

(22) Filed: Jan. 26, 2009

(65) Prior Publication Data

US 2009/0205608 A1 Aug. 20, 2009

Related U.S. Application Data

(63) Continuation-in-part of application No. PCT/JP2007/063638, filed on Jul. 9, 2007.

(30) Foreign Application Priority Data

Jul. 25, 2006 (JP) ................................ 2006-202614
Jun. 29, 2007 (JP) ................................ 2007-172933

(51) Int. Cl.
*F02B 47/10* (2006.01)
*F02M 25/07* (2006.01)

(52) U.S. Cl. .............. 123/568.13; 123/568.14; 123/306; 123/308

(58) Field of Classification Search .................. 123/306, 123/308, 316, 569.13, 568.14
See application file for complete search history.

(56) References Cited

U.S. PATENT DOCUMENTS

| 4,354,463 | A | | 10/1982 | Otani et al. |
| 4,422,430 | A | * | 12/1983 | Wiatrak ................... 123/568.13 |
| 5,690,081 | A | * | 11/1997 | Kwiatkowski ............ 123/568.12 |
| RE40,381 | E | * | 6/2008 | Gianolio et al. ........... 123/90.12 |
| 7,765,994 | B2 | * | 8/2010 | Winstead ................. 123/568.13 |
| 2004/0123820 | A1 | * | 7/2004 | Hasegawa et al. ........... 123/58.8 |
| 2008/0168967 | A1 | * | 7/2008 | Higaki et al. ............. 123/568.13 |

FOREIGN PATENT DOCUMENTS

| DE | 3903474 A1 | 9/1989 |
| EP | 0 953 744 A1 | 11/1999 |
| FR | 2 864 166 A1 | 6/2005 |
| JP | 54-49405 | 4/1979 |
| JP | 56-44404 | 4/1981 |
| JP | 57-26631 | 2/1982 |
| JP | 3-95062 | 9/1991 |
| JP | 05-86992 | 4/1993 |

OTHER PUBLICATIONS

Official Communication issued in corresponding European Patent Application No. 07768362, completed on Feb. 18, 2010.
International Search Report dated Sep. 4, 2007.

* cited by examiner

*Primary Examiner* — Erick Solis
(74) *Attorney, Agent, or Firm* — Keating & Bennett, LLP

(57) ABSTRACT

A four stroke internal combustion engine has a gas reserving chamber 100 which communicates with an exhaust port 31 and is configured to reserve burned gas discharged from a combustion chamber. The burned gas flows into the gas reserving chamber 100 while an exhaust valve including a valve head 32*a* and a stem 32*b* is opened in an expansion stroke. The burned gas reserved in the gas reserving chamber 100 is discharged to the combustion chamber while the exhaust valve is opened in an intake stroke.

20 Claims, 18 Drawing Sheets

FOUR STROKE INTERNAL COMBUSTION ENGINE

RELATED APPLICATIONS

This application is a Continuation-In-Part of International Patent Application No. PCT/JP2007/063638 filed on Jul. 9, 2007. This application claims priority under 35 U.S.C. §119 to Japanese Patent Application No. 2006-202614 filed on Jul. 25, 2006 and to Japanese Patent Application No. 2007-172933 filed on Jun. 29, 2007. Each of the entire disclosures of the above one PCT and two Japanese applications is incorporated herein by reference in its entirety.

BACKGROUND

1. Field of the Invention

The preferred embodiments of the present invention relate, inter alia, to a four stroke internal combustion engine, and, more particularly, to a four stroke internal combustion engine configured to generate a swirl in a combustion chamber by exhaust gas (e.g., burned gas) or fresh air (e.g., only air or an air-fuel mixture).

2. Description of the Related Art

The following description sets forth the inventor's knowledge of related art and problems therein and should not be construed as an admission of knowledge in the prior art.

Conventionally, four stroke internal combustion engines having an exhaust gas re-circulation (EGR) system are widely used. In this system, a part of exhaust gas is returned to a combustion chamber to moderate burning of air-fuel mixture and lower the maximum combustion temperature in the combustion chamber to thereby decrease emission of nitrogen oxides (NOx).

For example, an EGR system structured as described below is known (see, e.g., pages 4-5 and FIGS. 4-5 of Japanese Unexamined Laid-open Patent Application Publication No. H05-86992). Specifically, the EGR system includes an auxiliary exhaust valve provided at an auxiliary exhaust port communicated with a combustion chamber and a gas reserving chamber configured to reserve a part of exhaust gas (EGR gas) discharged through the auxiliary exhaust port. The EGR gas reserved in the gas reserving chamber is returned to the combustion chamber at a preset timing.

According to such a four stroke internal combustion engine having the conventional exhaust gas re-circulation (EGR) system described above, improvement of fuel consumption resulting from decrease of pumping loss can be attained. In recent years, however, further improvement of fuel consumption has been desired.

Also, the four stroke internal combustion engine having the conventional EGR system described above requires the auxiliary exhaust gas port and the auxiliary exhaust gas valve in addition to a main exhaust gas port and a main exhaust gas valve for discharging exhaust gas. This complicates the structure of the cylinder head part, resulting in, e.g., increased manufacturing costs.

The description herein of advantages and disadvantages of various features, embodiments, methods, and apparatus disclosed in other publications is in no way intended to limit the present invention. For example, certain features of the preferred embodiments of the invention may be capable of overcoming certain disadvantages and/or providing certain advantages, such as, e.g., disadvantages and/or advantages discussed herein, while retaining some or all of the features, embodiments, methods, and apparatus disclosed therein.

SUMMARY

The preferred embodiments of the present invention have been developed in view of the above-mentioned and/or other problems in the related art. The preferred embodiments of the present invention can significantly improve upon existing methods and/or apparatuses.

Among other potential advantages, some embodiments can provide a four stroke engine capable of further improving fuel consumption and decreasing emission of nitrogen oxides (NOx) without complicating the structure of the cylinder head portion.

According to a first aspect of the present invention, a four stroke internal combustion engine (engine) includes a combustion chamber, an intake passage (intake port) which opens into the combustion chamber, an exhaust passage (exhaust port) which opens into the combustion chamber, an intake valve which opens and closes a combustion chamber side opening of the intake passage, and an exhaust valve which opens and closes a combustion chamber side opening of the exhaust passage. The four stroke internal combustion engine includes a gas reserving chamber which communicates with the exhaust passage and is configured to reserve burned gas G discharged from the combustion chamber. The burned gas flows into the gas reserving chamber while the exhaust valve is opened in an expansion stroke or an exhaust stroke. The burned gas reserved in the gas reserving chamber is discharged to the combustion chamber while the exhaust valve is opened in an intake stroke.

According to the aforementioned four stroke internal combustion engine according to the first aspect of the present invention, an internal EGR amount can be increased as compared with a conventional one, resulting in decreased pumping loss.

Furthermore, in the aforementioned four stroke internal combustion engine according to the first aspect of the present invention, since the gas reserving chamber that communicates with the exhaust passage and is configured to reserve the burned gas discharged from the combustion chamber is provided, no special intake and exhaust passages and valves for communicating with the gas reserving chamber are required.

In other words, according to the aforementioned features, it is possible to provide a four stroke engine capable of further improving fuel consumption and decreasing emission of nitrogen oxides (NOx) without complicating the structure of the cylinder head part complicated.

In the aforementioned four stroke internal combustion engine according to the first aspect of the present invention, it is preferably configured such that the burned gas flows into the gas reserving chamber while the exhaust valve is opened in the expansion stroke and the exhaust gas is discharged to the combustion chamber while the exhaust valve is opened in the intake stroke.

In the aforementioned four stroke internal combustion engine according to the first aspect of the present invention, it is preferably configured such that the timing for discharging the burned gas to the combustion chamber is set within an overlap time period in which both of the intake valve and the exhaust valve are opened.

In the aforementioned four stroke internal combustion engine according to the first aspect of the present invention, it is preferably configured such that the exhaust valve is formed by a valve head which opens or closes the opening to the combustion chamber and a stem extending from the valve head, and that a gas communicating passage (burned gas guiding conduit) communicating with the gas reserving chamber from a portion of the burned gas passage in the vicinity of the valve head is further provided.

In the aforementioned four stroke internal combustion engine according to the first aspect of the present invention, it is preferably configured such that an end portion of the gas communicating passage is oriented in a direction along a peripheral portion of the combustion chamber.

In the aforementioned four stroke internal combustion engine according to the first aspect of the present invention, it is preferably configured such that a fresh air reserving chamber which communicates with the intake passage and is configured to reserve fresh air flowing in the intake passage is provided, and that the air reserved in the fresh air reserving chamber is introduced into the combustion chamber while the intake valve is opened in the intake stroke.

In the aforementioned four stroke internal combustion engine according to the first aspect of the present invention, it is preferably configured such that a fresh air reserving chamber for reserving fresh air flowing in the intake passage and a first fresh air communicating passage communicating with the fresh air reserving chamber and a portion of the intake passage in the vicinity of the combustion chamber side opening are provided, that the fresh air flows into the fresh air reserving chamber through the first fresh air communicating passage in accordance with pressure change in the intake passage, and that the fresh air reserved in the fresh air reserving chamber is introduced into the combustion chamber through the first fresh air communicating passage while the intake valve is opened in the intake stroke.

In the aforementioned four stroke internal combustion engine according to the first aspect of the present invention, it is preferably configured such that a second fresh air communicating passage communicating with the fresh air reserving chamber and the intake passage is provided, that the fresh air flows into the fresh air reserving chamber through the first and second air communicating passages in accordance with pressure change in the intake passage, and that the fresh air reserved in the fresh air reserving chamber is introduced into the combustion chamber through the first fresh air communicating passage while the intake valve is opened in the intake stroke.

In the aforementioned four stroke internal combustion engine according to the first aspect of the present invention, it is preferably configured such that the second fresh air communicating passage communicates with a portion of the intake passage located downstream and in the vicinity of a throttle valve of the intake passage.

In the aforementioned four stroke internal combustion engine according to the first aspect of the present invention, it is preferably configured such that the gas communicating passage through which the gas reserving chamber and the portion of the exhaust passage in the vicinity of the combustion chamber side opening communicate with each other is arranged to be oriented in a tangential direction relative to an inner circumference of the combustion chamber.

In the aforementioned four stroke internal combustion engine according to the first aspect of the present invention, it is preferably configured such that the first fresh air communicating passage through which the fresh air reserving chamber and the portion of the intake passage located in the vicinity of the combustion chamber side opening communicate with each other is arranged to make a tangent relative to a concentric circle defined to be closer to the center of the combustion chamber.

According to a second aspect of the present invention, a four stroke internal combustion engine includes a combustion chamber, an intake passage which opens into the combustion chamber, an exhaust passage which opens into the combustion chamber, an intake valve which opens and closes a combustion chamber side opening of the intake passage, and an exhaust valve which opens and closes a combustion chamber side opening of the exhaust passage. The four stroke internal combustion engine includes a fresh air reserving chamber which communicates with the intake passage through a first fresh air communicating passage and is configured to reserve fresh air flowing in the intake passage, and that the fresh air reserved in the fresh air reserving chamber is introduced into the combustion chamber while the intake valve is opened in an intake stroke.

In the aforementioned four stroke internal combustion engine according to the second aspect of the present invention, it is preferably configured such that a second fresh air communicating passage through which the fresh air reserving chamber and the intake passage communicate with each other is provided, that the fresh air flows into the fresh air reserving chamber through the first and second fresh air communicating passages while the intake valve is closed, and that the fresh air reserved in the fresh air reserving chamber is introduced into the combustion chamber through the first fresh air communicating passage while the intake valve is opened in the intake stroke.

In the aforementioned four stroke internal combustion engine according to the second aspect of the present invention, it is preferably configured such that the second fresh air communicating passage communicates with a portion of the intake passage located downstream and in the vicinity of a throttle valve of the intake passage.

According to a third aspect of the present invention, a four stroke internal combustion engine includes a combustion chamber, an intake passage which opens into the combustion chamber, an exhaust passage which opens into the combustion chamber, an intake valve which opens and closes a combustion chamber side opening of the intake passage, an exhaust valve which opens and closes a combustion chamber side opening of the exhaust passage, and a throttle valve which changes a passage area of the intake passage. The four stroke internal combustion engine includes a third fresh air communicating passage through which a portion of the intake passage located downstream the throttle valve and in the vicinity of the throttle valve and another portion of the intake passage located in the vicinity of the combustion chamber side opening communicate with each other, and that a downstream end of the third fresh air communicating passage is arranged to be oriented in a tangential direction relative to an inner circumference of the combustion chamber.

According to a fourth aspect of the present invention, a four stroke internal combustion engine (for example, engine) includes a combustion chamber (combustion chamber), a combustion chamber defining section (cylinder block and cylinder head) defining the combustion chamber, an intake passage (intake port) which opens into the combustion chamber, an exhaust passage (exhaust port) which opens into the combustion chamber, an intake valve (intake valve) which opens and closes a combustion chamber side opening of the intake passage, and an exhaust valve (exhaust valve) which opens and closes a combustion chamber side opening of the exhaust passage, that the combustion chamber defining section has a gas reserving chamber (gas reserving chamber) which communicates with the exhaust passage and is configured to reserve burned gas discharged from the combustion chamber, that the burned gas flows into the gas reserving chamber while the exhaust valve is opened in an expansion stroke or an exhaust stroke, and that the burned gas reserved in the gas reserving chamber is discharged to the combustion chamber while the exhaust valve is opened in an intake stroke.

According to the above feature, because the gas reserving chamber communicating with the exhaust passage is disposed in the combustion chamber defining section, the four stroke internal combustion engine can be downsized and assembling work of the four stroke internal combustion engine can be easily done, in comparison with another arrangement in which the gas reserving chamber is disposed outside the combustion chamber defining section.

In the aforementioned four stroke internal combustion engine according to the fourth aspect of the present invention, it is preferably configured such that the gas reserving chamber includes a gas reserving section (gas reserving section) for reserving the burned gas and a gas communicating passage section (gas communicating passage section) through which the gas reserving section and the exhaust passage communicate with each other, that the combustion chamber defining section includes a cylinder block (cylinder block) and a cylinder head (cylinder head) having a mating surface (mating surface) which faces the cylinder block, that the gas reserving section is formed in the cylinder head and has a cylinder head opening (opening) which opens into the mating surface, and that the cylinder block and the cylinder head are coupled with each other to close the cylinder head opening.

In the aforementioned four stroke internal combustion engine according to the fourth aspect of the present invention, it is preferably configured such that the gas reserving chamber (gas reserving chamber) includes a gas reserving section (gas reserving section) for reserving the burned gas and a gas communicating passage section (gas communicating passage section) through which the gas reserving section and the exhaust passage communicate with each other, that the combustion chamber defining section includes a cylinder block (cylinder block) and a cylinder head (cylinder head) having a mating surface (mating surface) which faces the cylinder block, that the gas reserving section is formed in the cylinder block and has a cylinder block opening (opening) which opens into the mating surface, and that the cylinder block and the cylinder head are coupled with each other to close the cylinder block opening.

In the aforementioned four stroke internal combustion engine according to the fourth aspect of the present invention, it is preferably configured such that the gas reserving chamber (gas reserving chamber) includes a gas reserving section (gas reserving section) for reserving the burned gas and a gas communicating passage section (gas communicating passage section) through which the gas reserving section and the exhaust passage communicate with each other, that the combustion chamber defining section includes a cylinder block (cylinder block) and a cylinder head (cylinder head) having a mating surface (mating surface) which faces the cylinder block, that the gas reserving section is formed in the cylinder head and the cylinder block, part of the gas reserving section formed in the cylinder head having a cylinder head opening (cylinder head opening) which opens into the mating surface, the other part of the gas reserving section formed in the cylinder block having a cylinder block opening (cylinder block opening) which opens into the cylinder head, and that the cylinder head and the cylinder block are coupled with each other to communicate the cylinder head opening and the cylinder block opening.

In the aforementioned four stroke internal combustion engine according to the fourth aspect of the present invention, it is preferably configured such that the exhaust passage is formed in the cylinder head, and that the gas communicating passage section is formed between the exhaust passage and the mating surface.

In the aforementioned four stroke internal combustion engine according to the fourth aspect of the present invention, it is preferably configured such that the combustion chamber has a generally circular shape in a plan view, and at least a portion of the gas communicating passage section positioned closer to the exhaust passage is oriented in a preset rotational direction (counterclockwise direction) along a peripheral portion (peripheral portion) of the combustion chamber.

In the aforementioned four stroke internal combustion engine according to the fourth aspect of the present invention, it is preferably configured such that at least a portion of the gas communicating passage section positioned closer to the exhaust passage extends along the exhaust passage.

In the aforementioned four stroke internal combustion engine according to the fourth aspect of the present invention, it is preferably configured such that the exhaust passage is curved in a plan view of the combustion chamber defining section, and that at least a portion of the gas reserving chamber is positioned in an area inner than the curved exhaust passage in the plan view of the combustion chamber defining section.

In the aforementioned four stroke internal combustion engine according to the fourth aspect of the present invention, it is preferably configured such that the gas reserving chamber is provided on an outer part of the combustion chamber defining section.

In the aforementioned four stroke internal combustion engine according to the fourth aspect of the present invention, it is preferably configured such that the gas reserving chamber is protruded from the outer part.

In the aforementioned four stroke internal combustion engine according to the fourth aspect of the present invention, it is preferably configured such that the gas reserving chamber includes a proximal part (proximal part) on the outer part and a cover (cover) for closing the proximal part, and that in a space defined by the proximal part, a gas reserving section (gas reserving section) for reserving the burned gas is formed.

In the aforementioned four stroke internal combustion engine according to the fourth aspect of the present invention, it is preferably configured such that in a space defined by the cover, the gas reserving section (gas reserving section) for reserving the burned gas is formed.

In the aforementioned four stroke internal combustion engine according to the fourth aspect of the present invention, it is preferably configured such that the gas reserving chamber has a rectangular parallelepiped shape.

According to the features of the present invention, it is possible to provide a four stroke engine capable of further improving fuel economy and decreasing emission of nitrogen oxides (NOx) without complicating the structure of the cylinder head part complicated.

BRIEF DESCRIPTION OF THE DRAWINGS

The preferred embodiments of the present invention are shown by way of example, and not limitation, in the accompanying figures, in which.

DETAILED DESCRIPTION OF THE PREFERRED EMBODIMENTS

Figure 1:
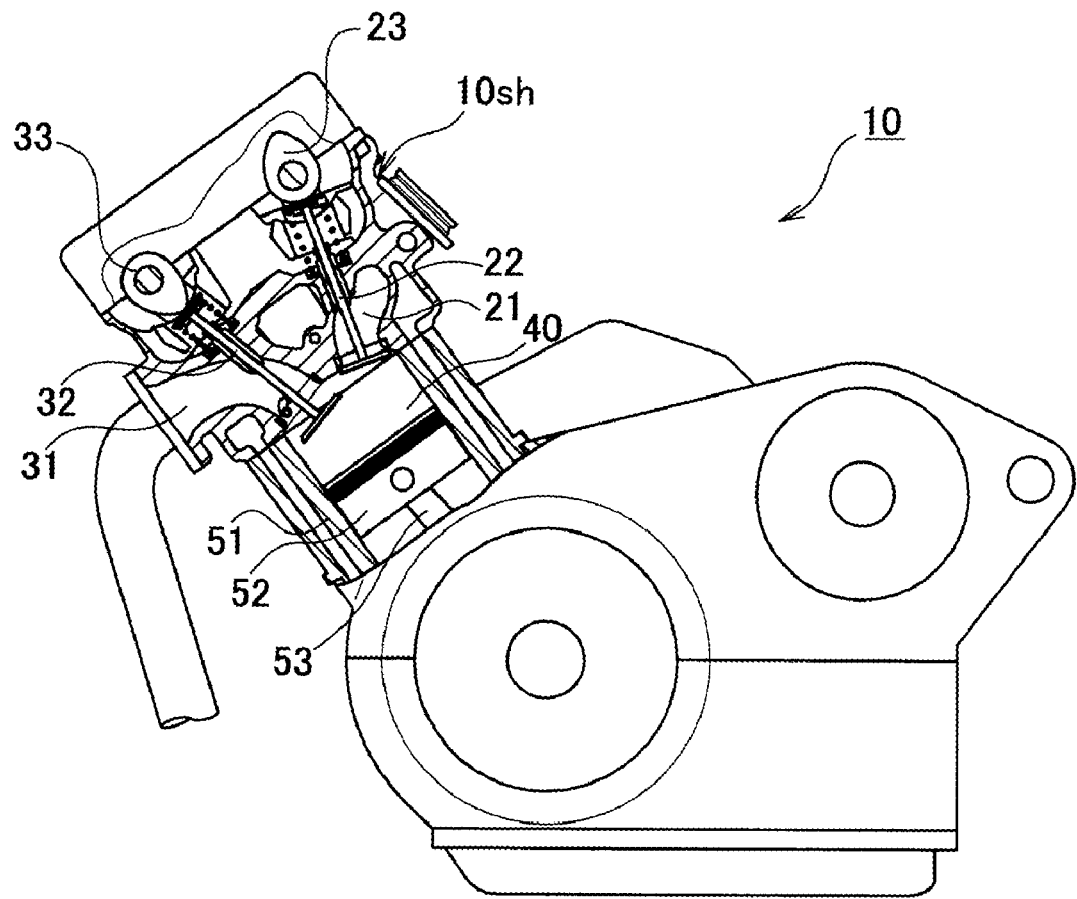
FIG. 1 is a schematic structural view of a four stroke internal combustion engine according to a first embodiment of the present invention.

In the following paragraphs, some preferred embodiments of the invention will be described by way of example and not limitation. It should be understood based on this disclosure that various other modifications can be made by those in the art based on these illustrated embodiments.

First Embodiment

Next, a first embodiment of a four stroke internal combustion engine according to the present invention will be described with reference to the attached drawings. In the drawings, the same or similar portions are assigned with the same or similar reference numerals. It should be noted that the drawings are schematic and the dimensional proportions, etc., may differ from those in reality.

Hence, specific dimensions, etc., should be determined in consideration of the following descriptions. Furthermore, as a matter of course, different drawings may include elements which have different dimensional relations and ratios.

A. Outline of Structure of Four Stroke Engine

FIG. 1 schematically shows the structure of an engine 10 which is a four stroke internal combustion engine according to this first embodiment. Specifically, FIG. 1 is a side elevational view of the engine 10 with a part of the cylinder head 10$sh$ depicted in cross-section.

As shown in FIG. 1, the engine 10 includes an intake port 21 and an exhaust port 31. The intake port 21 defines a portion of an intake passage in the cylinder head and opens into a combustion chamber 40. The exhaust port 31 defines a portion of an exhaust passage in the cylinder head and opens into the combustion chamber 40.

The intake port 21 has an intake valve 22. The exhaust port 31 has an exhaust valve 32.

The intake valve 22 is reciprocally moved by an intake camshaft 23 disposed at a top portion of the cylinder head 10$sh$ at predetermined timings. The intake valve 22, when moved reciprocally by the intake camshaft 23, opens and closes a combustion chamber side opening (portion corresponding to a valve seat 24 shown in FIG. 2) of the intake port 21.

Similarly, the exhaust valve 32 is reciprocally moved by an exhaust camshaft 33 disposed at a top portion of the cylinder head 10$sh$ at predetermined timings. The exhaust valve 32, when moved reciprocally by the exhaust camshaft 33, opens and closes a combustion chamber side opening (portion corresponding to a valve seat 34 shown in FIG. 2) of the exhaust port 31.

A cylinder 51 is formed below the cylinder head 10$sh$. A piston 52 for rotating a crankshaft (not shown) through a connecting rod 53 is disposed in the cylinder 51.

B. Structure of Cylinder Head Portion

Next, with reference to FIGS. 2 to 4, the specific structure of the cylinder head 10$sh$ portion will be described.

Figure 2:
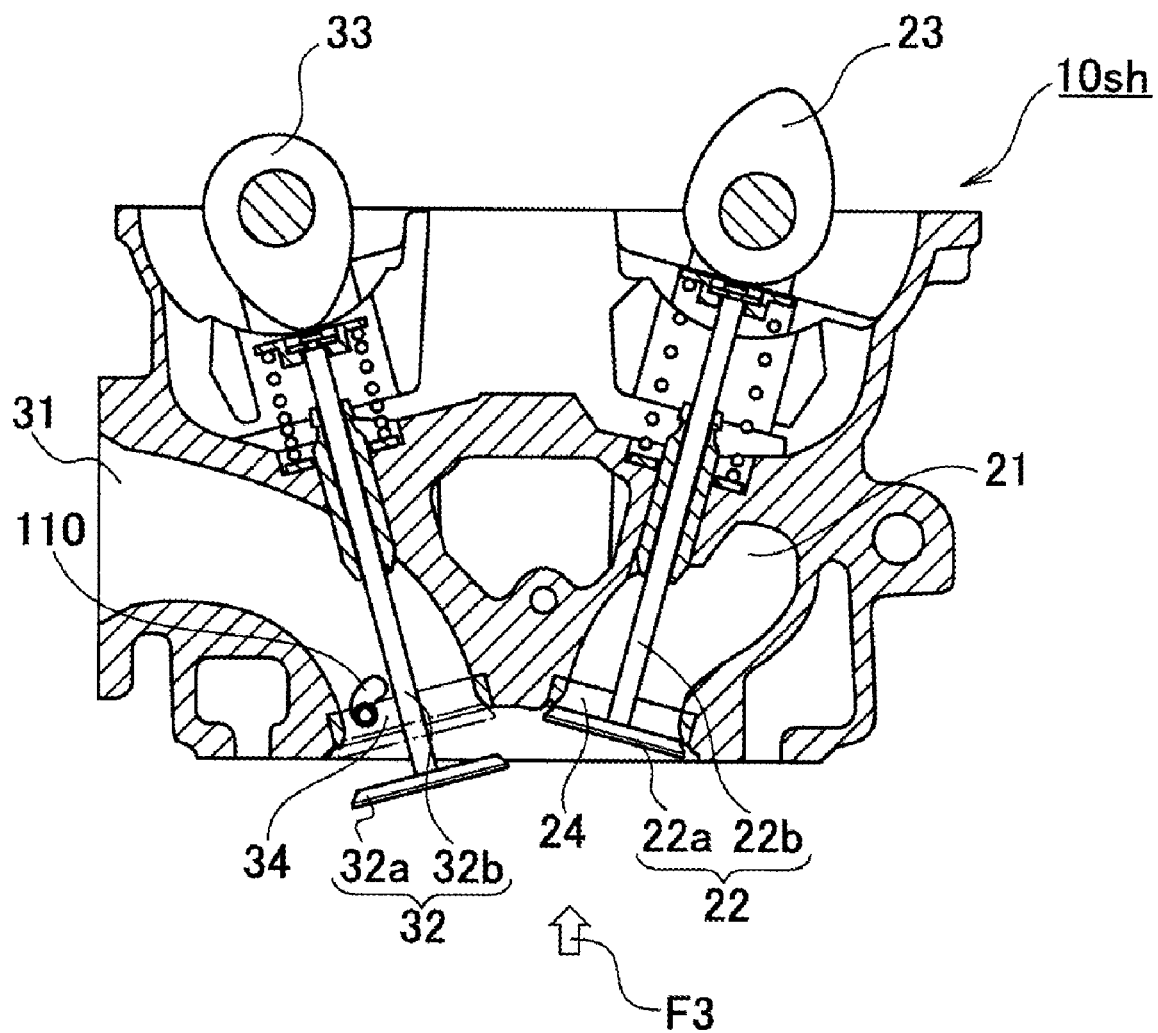
FIG. 2 is a cross-sectional view of a cylinder head portion of the four stroke internal combustion engine according to the first embodiment of the present invention.

FIG. 2 is a cross-sectional view of the cylinder head 10$sh$ portion. Specifically, FIG. 2 shows a cross-sectional view of the cylinder head 10$sh$ portion taken along a plane perpendicular to the intake camshaft 23 and the exhaust camshaft 33. FIG. 3 is a bottom view seen in the direction F3 indicated by the arrow in FIG. 2.

Figure 3:
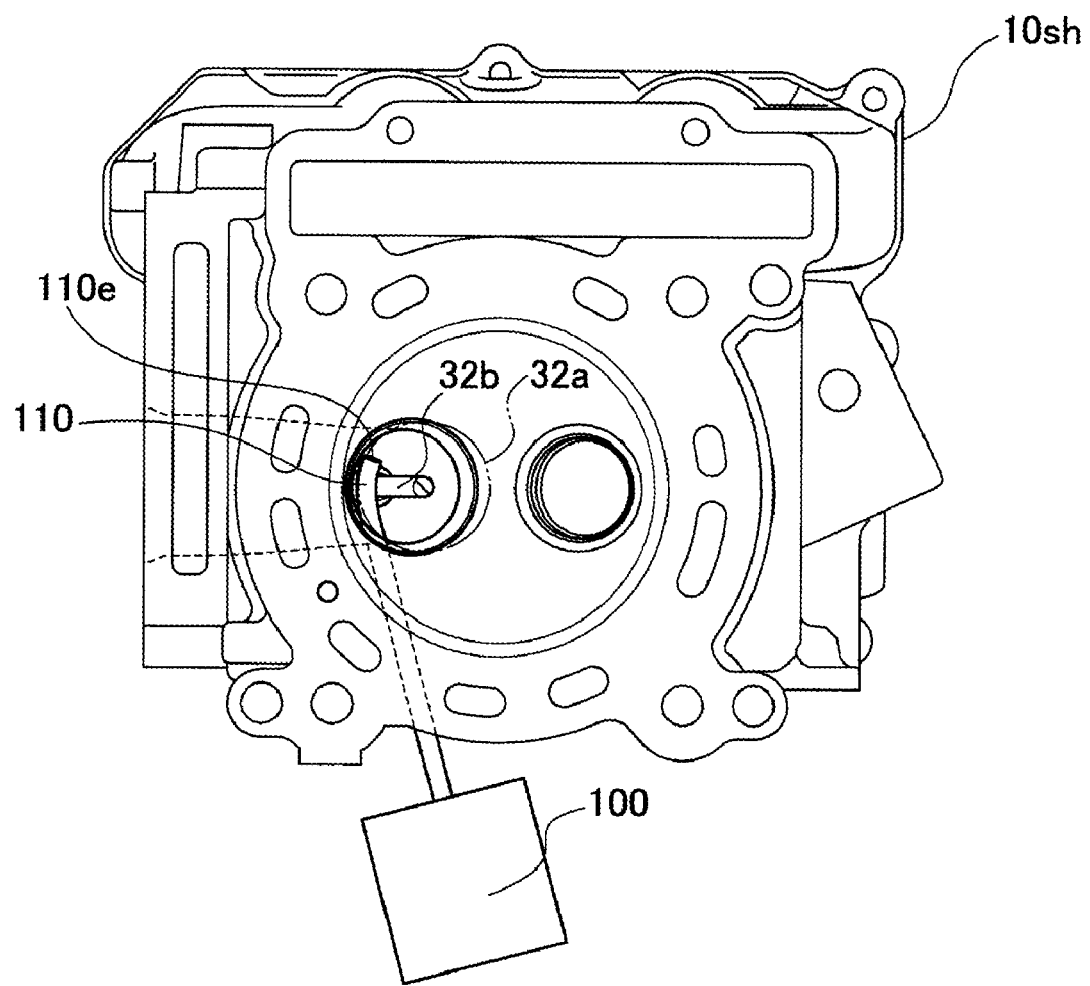
FIG. 3 is a view seen in the direction F3 indicated by the arrow in FIG. 2.

As shown in FIGS. 2 and 3, the intake valve 22 includes a valve head 22$a$ which opens and closes an opening of the intake port 21 to a combustion chamber 40 (see FIG. 1), specifically a portion of a valve seat 24, and a stem 22$b$ extending from the valve head 22$a$.

Similarly, the exhaust valve 32 includes a valve head 32$a$ which opens and closes an opening of the exhaust port 31 to the combustion chamber 40 (see FIG. 1), specifically a portion of a valve seat 34, and a stem 32$b$ extending from the valve head 32$a$.

The exhaust port 31 is provided with a burned gas guiding conduit (gas communicating passage) 110 communicated with a burned gas reserving chamber 100 at the vicinity of the valve head 32a. Specifically, an end portion 110e of the burned gas guiding conduit 110 is positioned near the valve head 32a but away from the valve head 32a toward the downstream side of the exhaust port 31 while keeping a proper distance not interfering with the valve head 32a when the valve head 32a closes the opening of the exhaust port 31.

Provided at the side of the cylinder head 10sh is a burned gas reserving chamber 100 configured to communicate with the exhaust port 31 and reserve the burned gas G (see FIG. 5) discharged from the combustion chamber 40.

The burned gas G flows into the burned gas reserving chamber 100 while the exhaust valve 32 is opened in the expansion stroke or the exhaust stroke of the engine 10. The burned gas G (EGR gas) reserved in the burned gas reserving chamber 100 is discharged to the combustion chamber 40 while the exhaust valve 32 is opened in the intake stroke of the engine 10.

More specific intake timing for intaking the burned gas G (EGR gas) into the burned gas reserving chamber 100 and for discharging the burned gas G (EGR gas) from the gas reserving chamber 100 will be described later.

Figure 4:
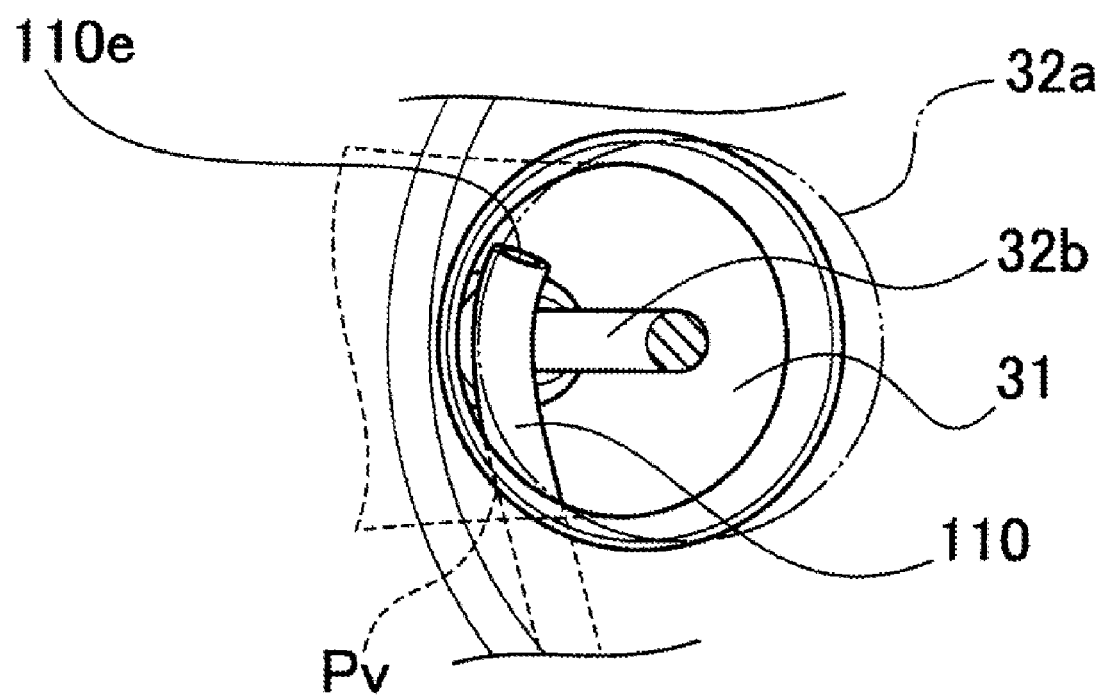
FIG. 4 is an enlarged view showing an exhaust port, the vicinity thereof, and an end portion of a burned gas guiding conduit shown in FIG. 3.

FIG. 4 is an enlarged view showing the exhaust port 31, the vicinity thereof, and the end portion 110e of the burned gas guiding conduit 110.

As shown in FIG. 4, the end portion 110e of the burned gas guiding conduit 110 is slightly curved. Specifically, the end portion 110e is oriented in the direction along the peripheral portion 40p (see FIG. 6) of the combustion chamber 40.

C. Inflow/Discharge Operations of Burned Gas

Next, with reference to FIGS. 5 to 7, operations regarding the inflow of the burned gas G into the burned gas reserving chamber 100 provided in the engine 10 and the discharge of the burned gas G (EGR gas) from the gas reserving chamber 100 will be described.

Figure 5:
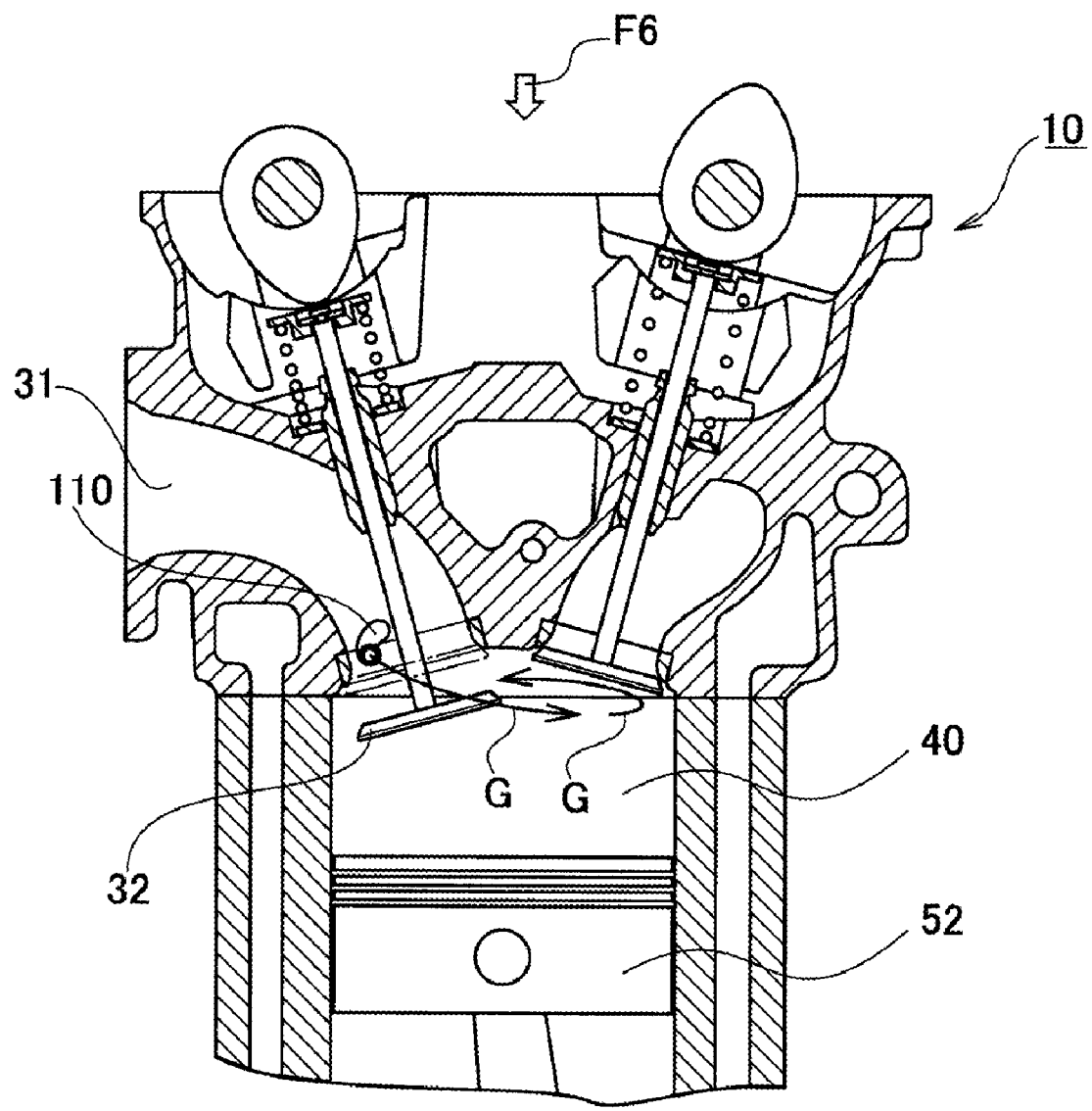
FIG. 5 is an enlarged cross-sectional view partially showing the four stroke internal combustion engine according to the first embodiment of the present invention.

FIG. 5 is an enlarged cross-sectional view partially showing the engine 10. The burned gas G reserved in the gas reserving chamber 100 is discharged into the combustion chamber 40 while the exhaust valve 32 is opened in the intake stroke of the engine 10.

Figure 6:
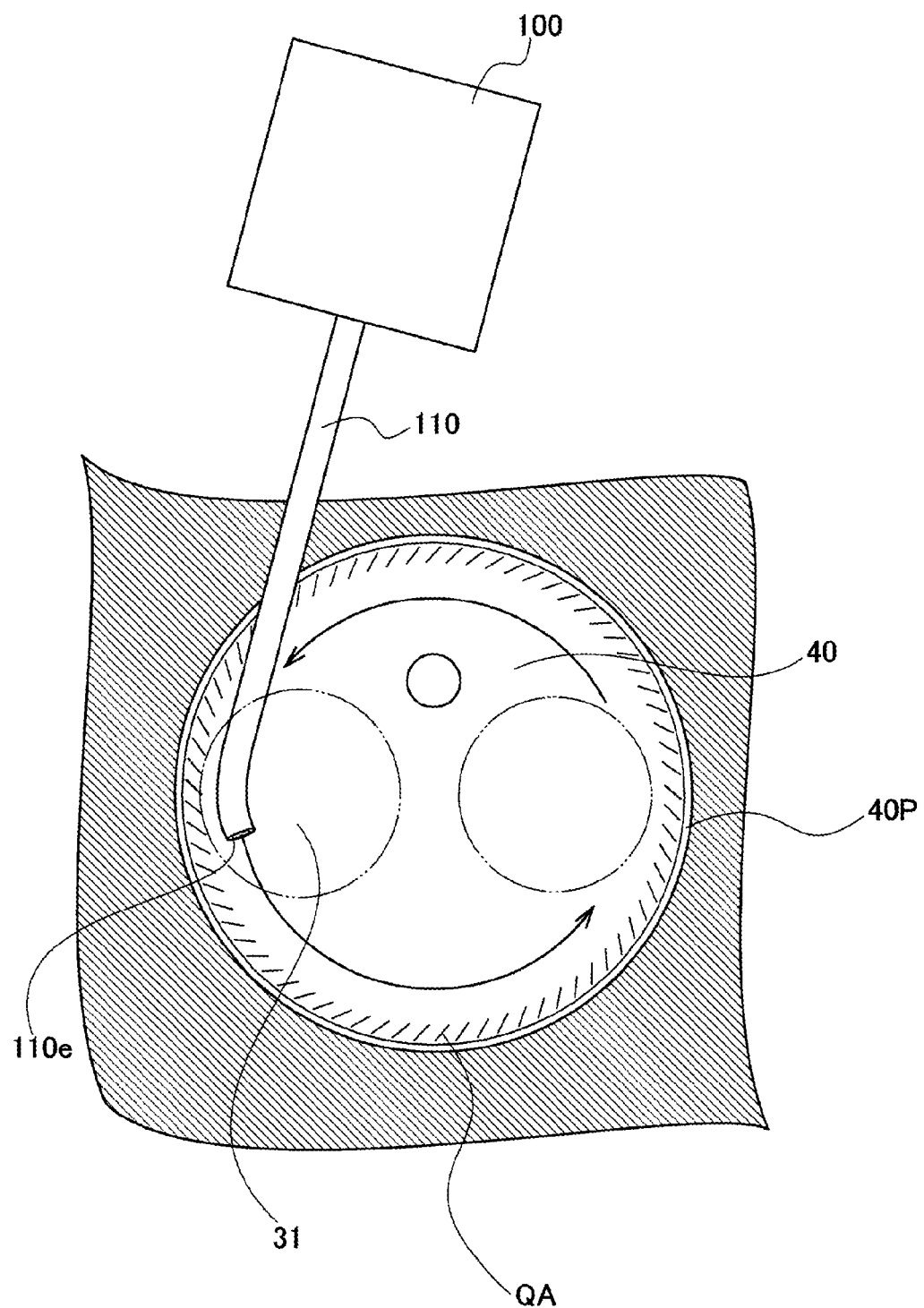
FIG. 6 is an enlarged schematic explanatory view showing a combustion chamber, a gas reserving chamber, and the burned gas guiding conduit according to the first embodiment of the present invention.

FIG. 6 is an enlarged view showing the combustion chamber 40, the gas reserving chamber 100, and the burned gas guiding conduit 110. Specifically, FIG. 6 is a view showing the combustion chamber 40, the gas reserving chamber 100, and the burned gas guiding conduit 110 as seen in the direction F6 indicated by the arrow in FIG. 5.

As shown in FIG. 6, the end portion 110e of the burned gas guiding conduit 110 positioned in the exhaust port 31 has a slightly curved configuration. Specifically, the end portion 110e is oriented in the direction along the peripheral portion 40p of the combustion chamber 40.

In this embodiment, the end portion 110e is oriented in the direction along the top surface of the piston 52, i.e., in a generally horizontal direction.

Because the end portion 110e is oriented in the direction along the peripheral portion 40p of the combustion chamber 40, the burned gas G (EGR gas) reserved in the gas reserving chamber 100 can be discharged into the peripheral portion 40p in a swirling manner.

Therefore, the unburned gas in a flame-out area, the so-called "quench area QA" (an area in which flame is cooled to go out as the flame travels, which is mainly generated in the peripheral portion 40p), decreases, which in turn can reduce the emission of hydrocarbon gas (HC).

More specifically, when the burned gas G (EGR gas) is discharged into the peripheral portion 40p in a swirling manner, the unburned gas in the quench area QA is vaporized by the high-temperature burned gas G (EGR gas). After the vaporization of the unburned gas, the quench area QA is filled with the burned gas G (EGR gas) to prevent inflow of unburned gas into the quench area QA.

This decreases unburned gas in the quench area QA to thereby reduce the emission of hydrocarbon gas (HC).

In this embodiment, the inner diameter of the burned gas guiding conduit 110 is set to 2.2 to 2.5 mm. The inner diameter and the conduit length of the burned gas guiding conduit 110 and the capacity of the gas reserving chamber 100 are preferably changed in accordance with, e.g., the displacement of the engine 10.

Figure 7:
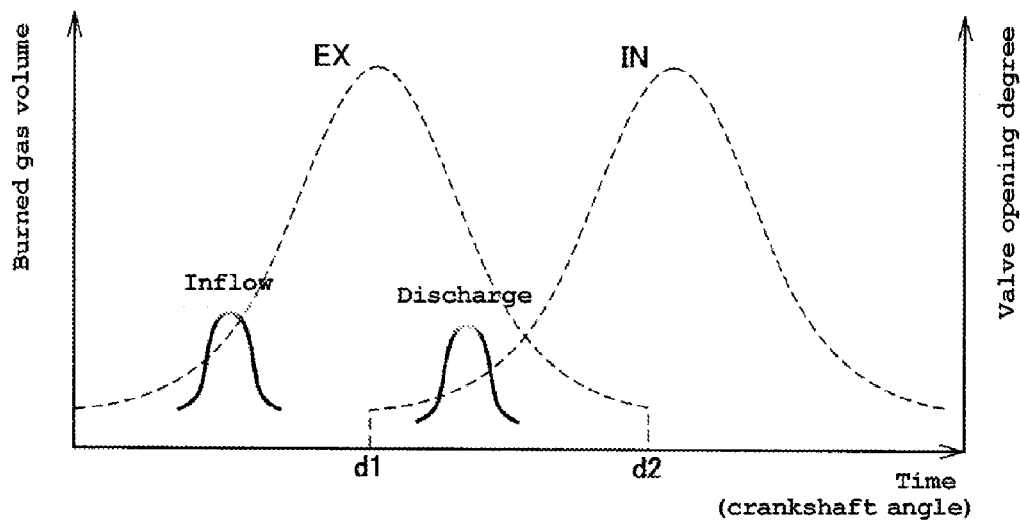
FIG. 7 is a graph showing the inflow timing of the burned gas to the gas reserving chamber and the discharge timing of the burned gas (EGR gas) from the gas reserving chamber in the first embodiment of the present invention.

FIG. 7 shows timings of the inflow of the burned gas G to the gas reserving chamber 100 and the discharge of the burned gas G (EGR gas) from the gas reserving chamber 100. In FIG. 7, the dotted line "EX" indicates opening degrees of the exhaust valve 32 corresponding to crankshaft angles. The dotted line "IN" indicates opening degrees of the intake valve 22 corresponding to the crankshaft angles.

The solid line denoted as "Inflow" indicates the amount and the timing of the inflow of the burned gas G flowing into the gas reserving chamber 100. The solid line denoted as "Discharge" indicates the amount and the timing of the discharge of the burned gas G (EGR gas) discharged from the gas reserving chamber 100.

As shown in FIG. 7, the burned gas G flows into the gas reserving chamber 100 in the expansion stroke of the engine 10, i.e., at the timing that the exhaust valve 32 opens while the piston 52 is pushed down toward the crankshaft (not shown) by the expansion of the burning gas.

Also, the burned gas G reserved in the gas reserving chamber 100 is discharged in the intake stroke of the engine 10, i.e., at the timing that the exhaust valve 32 opens while the air-fuel mixture flows into the combustion chamber 40 via the intake port 21.

More specifically, as shown in FIG. 7, the timing of discharging the burned gas G (EGR gas) into the combustion chamber 40 is set nearly to the timing of closing the exhaust valve 32.

D. Functions and Effects

Next, with reference to the data shown in FIGS. 8 to 11, functions and effects of the engine 10 having the gas reserving chamber 100 and the burned gas guiding conduit 110 described above will be described. The data shown in FIGS. 8 to 11 were measured under the following conditions.

Engine displacement: approximately 125 cc

Engine speed at measurement time: 3,000 rpm (0.6 kw output)

Figure 8:
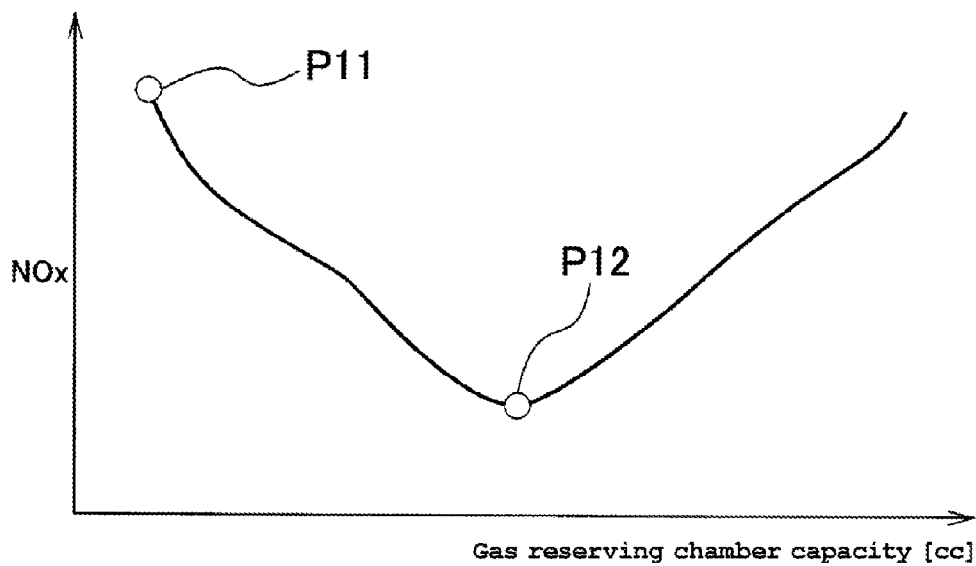
FIG. 8 is a graph showing the relationship between the capacity of the gas reserving chamber and the amount of nitrogen oxides (NOx) in the first embodiment of the present invention.

FIG. 8 is a graph showing the relationship between the capacity of the gas reserving chamber 100 and the nitrogen oxides (NOx). As shown in FIG. 8, the nitrogen oxides NOx under the condition that the capacity of the gas reserving chamber 100 was approximately 65 cc (P12 in the graph) decreased by approximately 15% in comparison with the nitrogen oxides under the condition that the capacity of the gas reserving chamber 100 was extremely small (P11 in the graph, approximately 0 cc).

As thus described, in the engine 10, since the gas reserving chamber 100 communicating with the exhaust port 31 and configured to reserve the burned gas G discharged from the combustion chamber 40 is provided, it is not required to provide dedicated intake and exhaust passages communicating with the gas reserving chamber 100 and valves thereof.

That is, according to the engine 10 having the gas reserving chamber 100 and the burned gas guiding conduit 110, it is possible to provide a four stroke internal combustion engine that can reduce emission of nitrogen oxides (NOx) without complicating the structure of the cylinder head 10sh.

Figure 9:
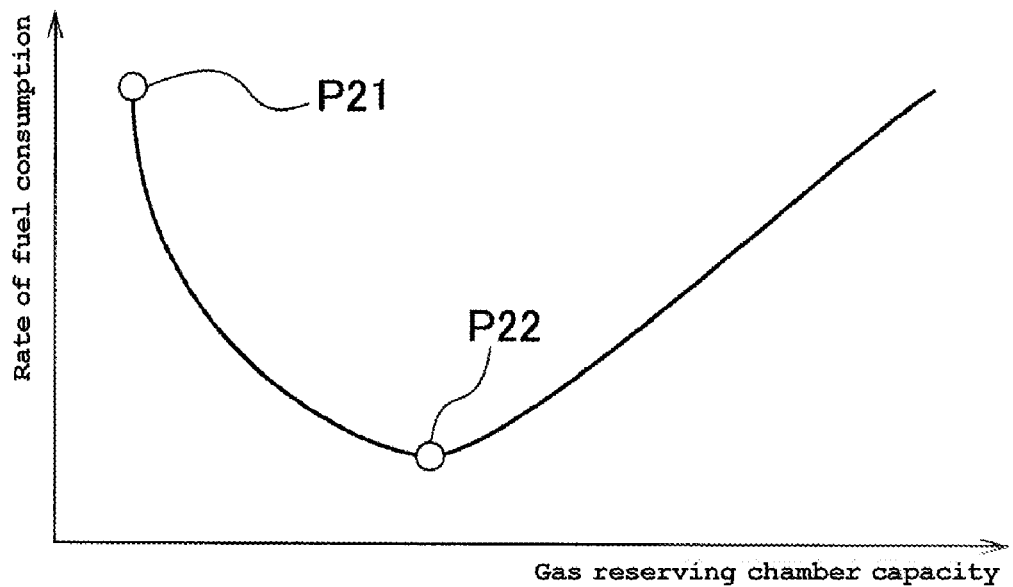
FIG. 9 is a graph showing the relationship between the capacity of the gas reserving chamber and the fuel consumption rate in the first embodiment of the present invention.
Figure 10:
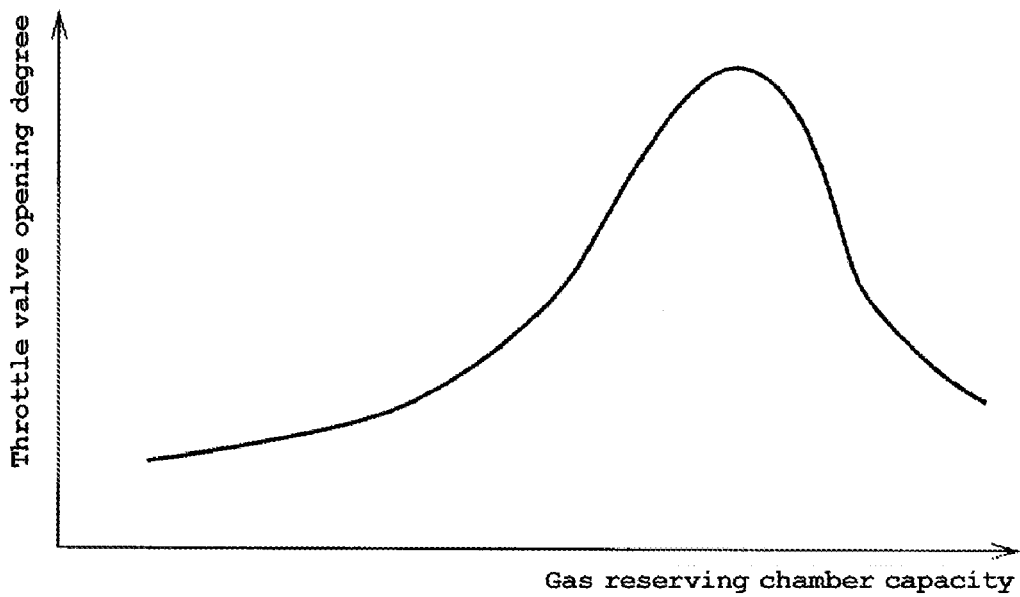
FIG. 10 is a graph showing the relationship between the capacity of the gas reserving chamber and the throttle (throttle valve) opening degree in the first embodiment of the present invention.

FIG. 9 is a graph showing the relationship between the capacity of the gas reserving chamber 100 and the fuel consumption rate. As shown in FIG. 9, the fuel consumption rate under the condition that the capacity of the gas reserving chamber 100 was approximately 45 cc (P22 in the graph) was improved by approximately 10% in comparison with the rate thereof under the condition that the capacity of the gas reserving chamber 100 was extremely small (P21 in the graph, approximately 0 cc). FIG. 10 is a graph showing the relationship between the capacity of the gas reserving chamber 100 and the opening degree of the throttle (throttle valve).

In the engine 10 having the gas reserving chamber 100 and the burned gas guiding conduit 110, the internal EGR amount can be increased as compared to a conventional engine since it is configured such that the exhaust gas G (EGR gas) is discharged into the combustion chamber 40 in the intake stroke. Furthermore, since the pumping loss of the engine 10 decreases, the throttle valve of the engine 10 can be set at a position on the open side, resulting in an improved fuel consumption rate.

Further, in the engine 10 having the gas reserving chamber 100 and the burned gas guiding conduit 110, it is possible to generate the swirl in the combustion chamber 40, which can further improve the combustion efficiency.

Figure 11:
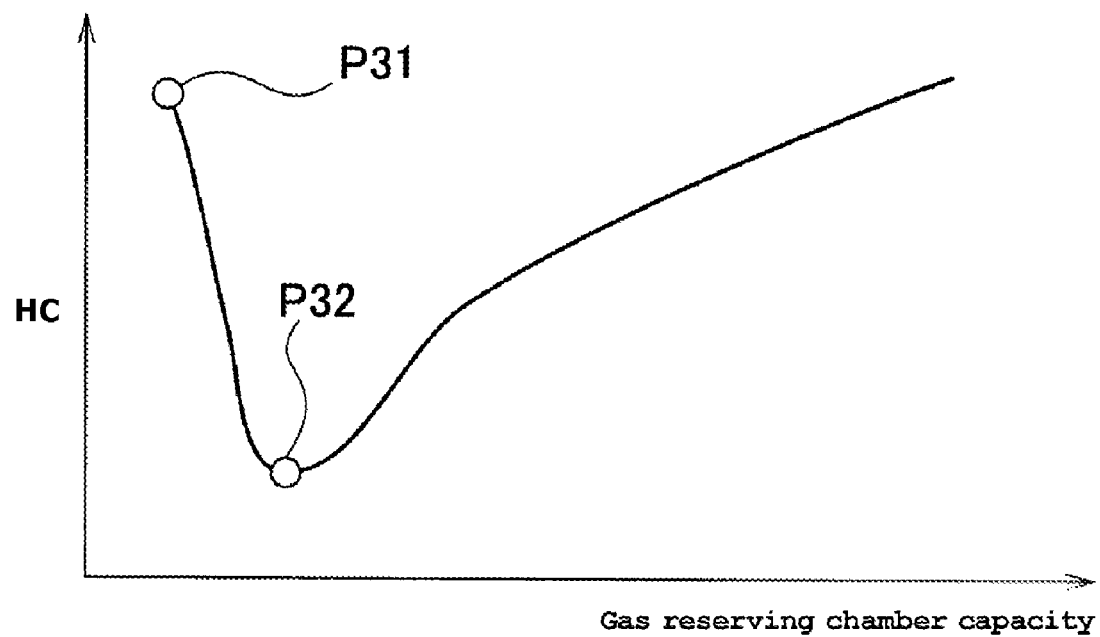
FIG. 11 is a graph showing the relationship between the capacity of the gas reserving chamber and the amount of hydrocarbon gas (HC) in the first embodiment of the present invention.

FIG. 11 is a graph showing the relationship between the capacity of the gas reserving chamber 100 and the hydrocarbon gas (HC). As shown in FIG. 11, the hydrocarbon gas under the condition that the capacity of the gas reserving chamber 100 was approximately 30 cc (P32 in the graph) decreased by approximately 7% in comparison with the hydrocarbon gas (HC) under the condition that the capacity of the gas reserving chamber 100 was extremely small (P31 in the graph, approximately 0 cc).

Although much hydrocarbon HC is generated in the quench area QA, the burned gas G (EGR gas) reserved in the gas reserving chamber 100 can be discharged into the peripheral portion 40p in a swirling manner because the end portion 110e of the burned gas guiding conduit 110 is oriented in the direction along the peripheral portion 40p of the combustion chamber 40. That is, in the engine 10, the generated amount of hydrocarbon HC can be reduced because unburned gas in the quench area QA is decreased by the EGR gas. In addition, in the engine 10, because the EGR gas is discharged (returned) to the combustion chamber 40 in a swirling manner, the EGR gas positioned in the vicinity of the peripheral portion 40p and fresh air-fuel mixture flowing into from the intake port 21 can be stratified.

That is, the EGR rate, which is a numerical value given by dividing the amount of the EGR gas to be returned to the combustion chamber 40 by the amount of the intake air, can be improved, which in turn can result in further improved fuel consumption rate and further enhanced exhaust gas purification.

Also, as described above, the inner diameter and the conduit length of the burned gas guiding conduit 110 and the capacity of the gas reserving chamber 100 are adjustable in accordance with the displacement of the engine 10 or the like. This enables easy setting of the timing of discharging the burned gas G (EGR gas) into the combustion chamber 40 in a proper engine speed range in accordance with characteristics of the engine 10 or the like.

E. Modified Embodiment

Although contents of the present invention are disclosed through the first embodiment of the present invention as described above, it should not be understood that the descriptions and drawings which are portions of the disclosure limit the scope of the present invention. The disclosure may provide the skilled persons in the art with various alternatives.

For example, in the first embodiment of the present invention described above, the burned gas G flows into the gas reserving chamber 100 at the timing that the exhaust valve 32 is opened in the expansion stroke of the engine 10 and the burned gas G (EGR gas) is discharged into the combustion chamber 40 at the timing that the exhaust valve 32 is opened in the intake stroke of the engine 10. However, the timings for the inflow and discharge of the burned gas G are not necessarily limited to those timings.

Furthermore, the embodiment of the present invention described above employs the structure in which the end portion 110e of the burned gas guiding conduit 110 is positioned in the vicinity of the valve head 32a. The burned gas guiding conduit 110, however, is not always required. In this modification, the burned gas guiding conduit 110 may terminate at, for example, the location PV indicated in FIG. 4, i.e., at the inner wall surface of the exhaust port 31.

Second Embodiment

Figure 12:
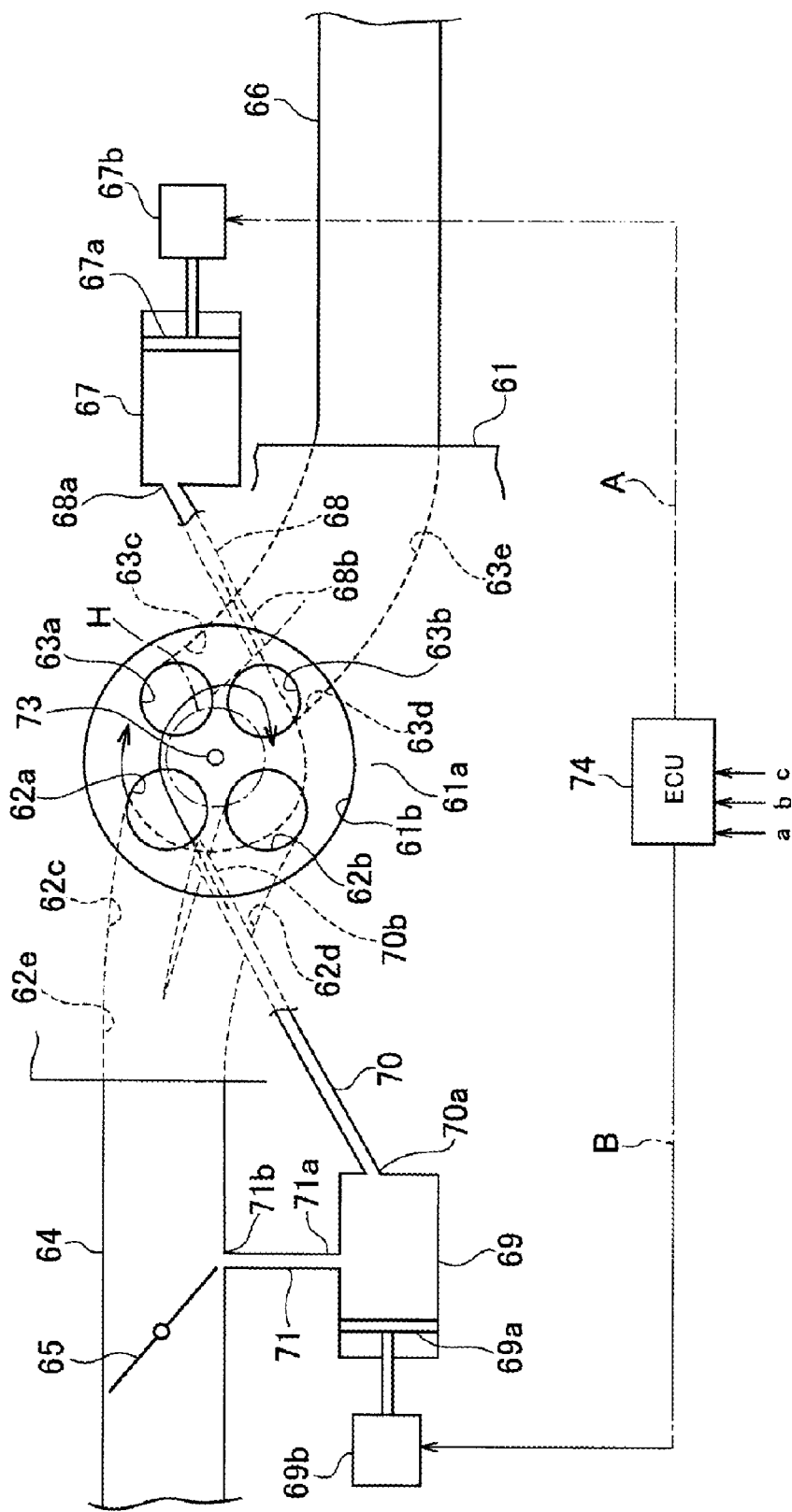
FIG. 12 is a schematic structural view of a four stroke internal combustion engine according to a second embodiment of the present invention.
Figure 13:
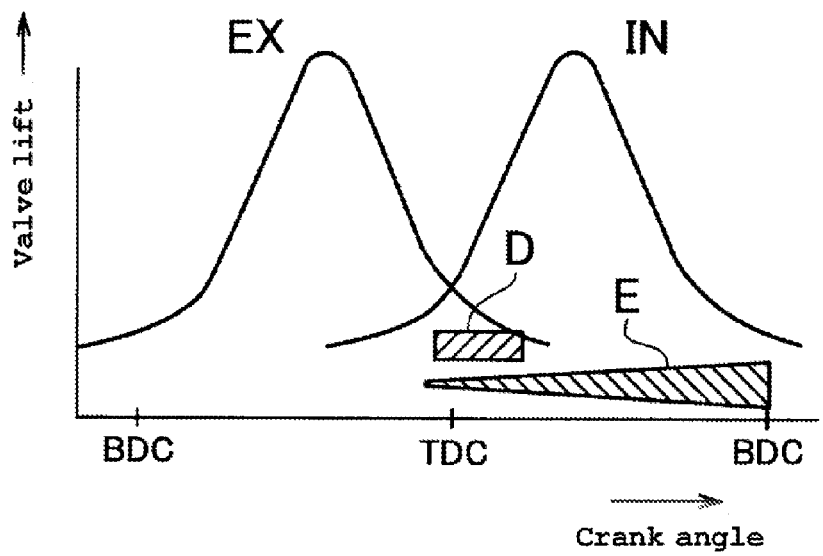
FIG. 13 is a graph for describing the introduction timing of the exhaust gas and fresh air in the second embodiment of the present invention.

FIGS. 12 and 13 are illustrations for describing a second embodiment of the present invention. The second embodiment is an example in which a fresh air reserving chamber 69 is provided in addition to the gas reserving chamber 67 that is the same one used in the first embodiment. In this embodiment, the term "fresh air" means not only air but also a mixture of air and fuel.

This engine in the second embodiment is a four stroke, single cylinder, four valve engine having two intake valves and two exhaust valves per cylinder. The engine generally has a structure in which a cylinder block, a cylinder head and a head cover are arranged on a top wall of a crankcase and fixed thereto.

A combustion concave portion 61b defining a ceiling wall of a combustion chamber is provided in a cylinder block side mating surface 61a of the cylinder head 61. The combustion concave portion 61b has two intake port openings 62a and 62b, and two exhaust port openings 63a and 63b. These intake port openings and exhaust port openings are opened and closed by intake valves and exhaust valves, respectively. An ignition plug 73 is positioned at a generally center part of the combustion concave portion 61b.

Branched intake ports 62c and 62d defining a cylinder head inner portion of an intake passage are connected to the respective intake port openings 62a and 62b. These two branched intake ports 62c and 62d are branched from a single and common main intake port 62e which also defines another cylinder head inner portion of the intake passage. An intake conduit 64 defining a cylinder head outer portion of the intake passage is connected to the outside coupling opening of the main intake port 62e. The intake conduit 64 has a throttle valve 65 which controls the intake passage area.

Branched exhaust ports 63c and 63d defining a cylinder head inner portion of an exhaust passage are connected to the respective exhaust port openings 63a and 63b. These two branched intake ports 63c and 63d are branched from a single and common main exhaust port 63e which also defines another cylinder head inner portion of the exhaust passage. An exhaust conduit 66 defining a cylinder head outer portion of the exhaust passage is connected to an outside coupling opening of the main exhaust port 63e.

A sealed box shaped gas reserving chamber 67, which is the same as the gas reserving chamber 100 in the first embodiment, is externally disposed at the exhaust port side of the cylinder head 61. One end 68a of a burned gas guiding passage (gas communicating passage) 68 is connected to the gas reserving chamber 67 to communicate with the inside of the gas reserving chamber. Another end 68b of the gas communicating passage 68 is connected to a portion of one branched exhaust port 63d located downstream and in the vicinity of the exhaust port opening 63b to communicate therewith.

In this regard, the other end 68b of the gas communicating passage 68 is formed to open into the combustion chamber through the exhaust port opening 63b and to be oriented in a tangential direction relative to the inner circumference of the combustion chamber. That is, both the axial direction and the position of the gas communicating passage 68 are set in such a manner that the exhaust gas reserved in the gas reserving chamber 67 is introduced into the combustion chamber while making swirling flow (lateral whirl) along the inner circumference of the combustion chamber.

A piston 67a is reciprocally disposed in the gas reserving chamber 67. This piston 67a is reciprocally driven by an actuator 67b, so that the capacity of the gas reserving chamber 67 can be changed freely.

A sealed box shaped fresh air reserving chamber 69, which is similar to the gas reserving chamber 67, is externally disposed at the intake port side of the cylinder head 61. One end 70a of a first fresh air communicating passage 70 is connected to the fresh air reserving chamber 69 to communicate with the inside of the fresh air reserving chamber. The other end 70b of the fresh air communicating passage 70 is connected to a portion of one branched intake port 62c located upstream and in the vicinity of the intake port opening 62a to communicate therewith.

The other end 70b of the first fresh air communicating passage 70 is formed to open into the combustion chamber through the intake port opening 62a and to be oriented in a tangential direction relative to a concentric circle H defined closer to the center of the combustion chamber. That is, both the axial direction and the position of the first fresh air communicating passage 70 are set in such a manner that the fresh air reserved in the fresh air reserving chamber 69 is introduced into the combustion chamber while making swirling flow (lateral whirl) circulating closer to the center of the combustion chamber.

In this regard, the swirling flow of the exhaust gas discharged from the gas reserving chamber 67 is formed closer to the outer circumference of the combustion chamber. The swirling flow of the fresh air discharged from the fresh air reserving chamber 69 is formed closer to the ignition plug 73. These two swirling flows stratify together to realize the so-called stratified charge combustion.

One end 71a of a second fresh air communicating passage 71 is connected to the fresh air reserving chamber 69 to communicate with the inside thereof. The other end 71b of the second fresh air communicating passage 71 communicates with a portion of the intake conduit 64 located downstream and in the close vicinity of the throttle valve 65 which is placed at an idling position.

Furthermore, a piston 69a is reciprocally disposed in the fresh air reserving chamber 69. The piston 69a is reciprocally driven by an actuator 69b, so that the capacity of the fresh air reserving chamber 69 can be changed freely.

The actuators 67b and 69b respectively receive a gas reserving chamber capacity control signal A and a fresh air reserving chamber capacity control signal B from an electronic control unit (ECU) 74. Signals indicating engine operational conditions, such as, e.g., an engine speed "a," a throttle opening "b," an engine temperature "c," are inputted into the ECU. The ECU 74 calculates the optimum gas reserving chamber capacity and optimum fresh air reserving chamber capacity based upon those input signals and outputs the control signals A and B for realizing the capacities to the respective actuators 67b and 69b.

In the second embodiment, the gas reserving chamber 67 communicates with the portion of the branched exhaust port 63d located downstream and in the vicinity of the exhaust port opening 63b through the gas communicating passage 68. Therefore, when the exhaust valve opens the exhaust port opening 63b almost at the end of the expansion stroke, a high blow-down pressure made by the exhaust gas acts on the gas communicating passage 68 so that the exhaust gas flows into the gas reserving chamber 67 and is reserved in the gas reserving chamber 67 under positive pressure. Then, the piston starts to go down before the exhaust valve closes the exhaust port opening 63b in the intake stroke. When the combustion chamber is negatively pressurized, as indicated by symbol D in FIG. 13, the exhaust gas reserved in the gas reserving chamber 67 is discharged into the combustion chamber through the exhaust port opening 63b.

The gas communicating passage 68 is arranged in such a manner that the axis thereof extends through the exhaust port opening 63b and generally makes a tangent relative to the inner circumference of the combustion chamber. The exhaust gas coming from the gas reserving chamber 67 thus is discharged in the tangential direction in the peripheral portion of the combustion chamber. This generates the swirling flow of the exhaust gas at the portion closer to the peripheral portion of the combustion chamber.

The fresh air reserving chamber 69 is negatively pressurized in the previous intake stroke. Also, the fresh air reserving chamber 69 communicates with the portion of the intake passage located in the vicinity of the intake port opening, and in the downstream vicinity of the throttle valve, through the first and second fresh air communicating passages 70 and 71. Therefore, when the intake valve closes the intake port opening at the end of the intake stroke, the fresh air is reserved in the fresh air reserving chamber 69.

When the piston goes down and the intake valve opens the intake port opening 62a in the next intake stroke, the fresh air reserved in the fresh air reserving chamber 69 is introduced into the combustion chamber from the intake port opening 62a through the first fresh air communicating passage 70. On this occasion, because the fresh air reserving chamber 69 communicates with the portion of the intake passage located downstream the throttle valve and in the close vicinity thereof through the second fresh air communicating passage 71, the fresh air is continuously introduced through the second fresh air communicating passage 71, the fresh air reserving chamber 69 and the first fresh air communicating passage 70 until almost the end of the intake stroke. In addition, the closer the intake stroke approaches to the end thereof, the more the fresh air is introduced into the combustion chamber (see reference symbol E of FIG. 13).

The first fresh air communicating passage 70 is arranged in such a manner that the axis thereof extends through the intake port opening 62a and generally makes a tangent relative to the concentric circle H formed closer to the ignition plug 73 of the combustion chamber. The fresh air coming from the fresh air reserving chamber 69 thus is introduced in the tangential direction that is closer to the center of the combustion chamber, so that the swirling flow of the fresh air is formed closer to the center of the combustion chamber.

As described above, the swirling flow by the exhaust gas is generated closer to the outer circumference of the combustion chamber, while the swirling flow by the fresh air is made closer to the ignition plug 73. The outer and inner double swirling flows realize the stratified charge. This reduces the pumping loss caused by introducing the exhaust gas, resulting in improved fuel consumption. Simultaneously, the combustion performance by the fresh air swirling flow can be improved, which in turn can improve the exhaust gas properties.

In the first embodiment, (1) the example in which only the gas reserving chamber 100 is provided was described. In the second embodiment, (2) the arrangement in which both of the gas reserving chamber 67 and the fresh air reserving chamber 69 are provided, and the fresh air reserving chamber 69 communicates with the location downstream the throttle valve was described. In the present invention, however, another modifications (3) to (6) as described below can also be applied:

(3) Only the fresh air reserving chamber 69 is provided, and the fresh air reserving chamber 69 and the intake passage communicate with each other through the first and second fresh air communicating passages 70 and 71.

(4) Only the fresh air reserving chamber 69 is provided, and the fresh air reserving chamber 69 and the intake passage communicate with each other through the first fresh air communicating passage 70. No second fresh air communicating passage 71 is provided.

(5) Both of the gas reserving chamber 67 and the fresh air reserving chamber 69 are provided. In this arrangement, however, the fresh air reserving chamber 69 and the intake passage communicate with each other through only the first fresh air communicating passage 70.

Figure 15:
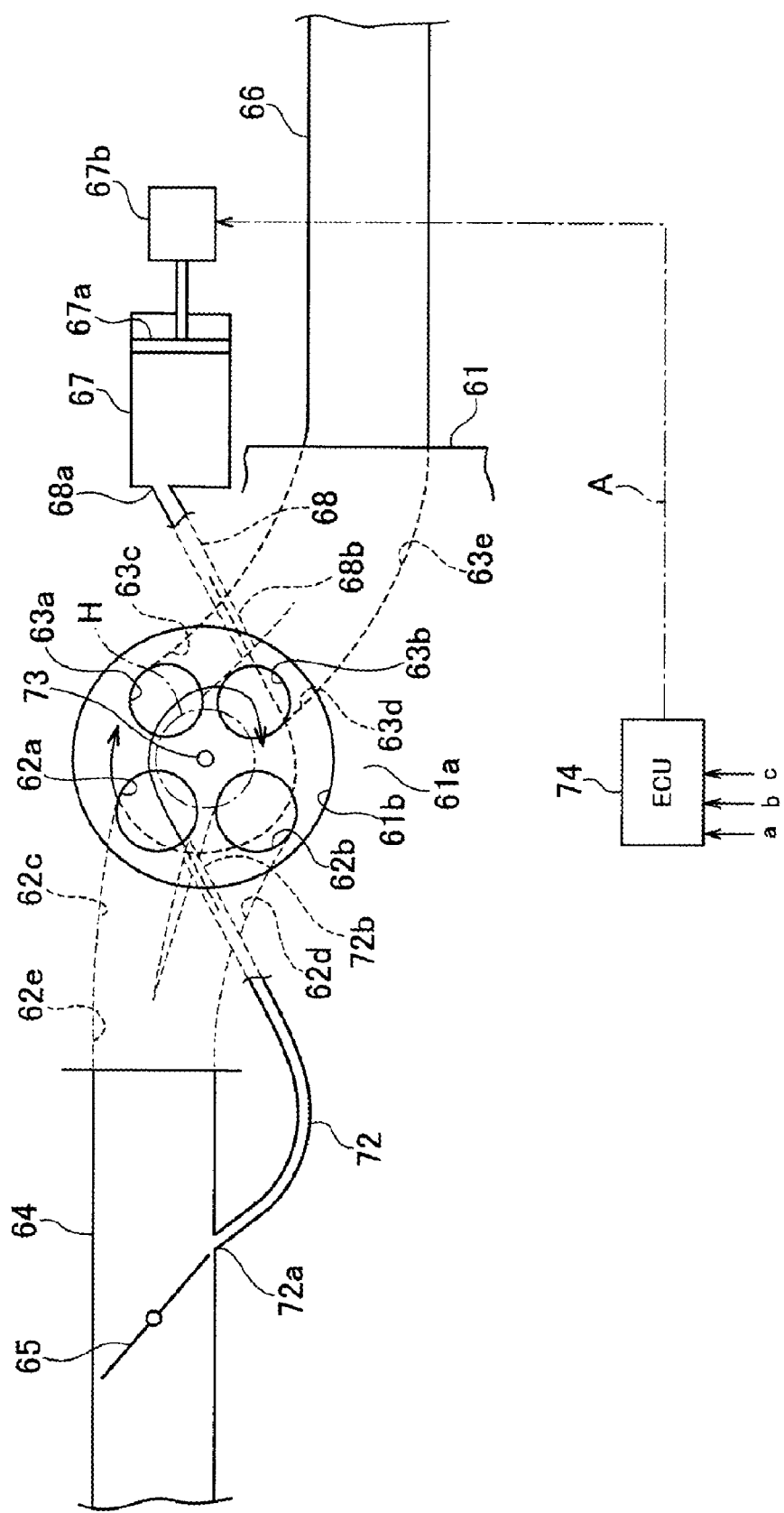
FIG. 15 is a schematic structural view of a modification of the second embodiment of the present invention.

(6) As shown in FIG. 15, the gas reserving chamber 67 is provided at the exhaust side. On the other hand, no fresh air reserving chamber 69 is provided at the intake side, and the portion of the intake passage located downstream the throttle valve and in the vicinity thereof and the portion of the intake passage located in the vicinity of the intake port opening communicate with each other directly through a third fresh air communicating passage 72. An upstream end 72*a* of the third fresh air communicating passage 72 is connected to a portion located downstream of the throttle valve and in the vicinity thereof, and a downstream end 72*b* is connected to a portion located in the vicinity of the intake port opening. Further, the axial direction of the downstream end 72*b* portion and the position thereof are set in such a manner that the fresh air swirling flow occurs at a portion closer to the center of the combustion chamber. More specifically, the downstream end 72*b* is oriented in the tangential direction relative to the inner circumference of the combustion chamber.

A. Functions and Effects

Figure 14:
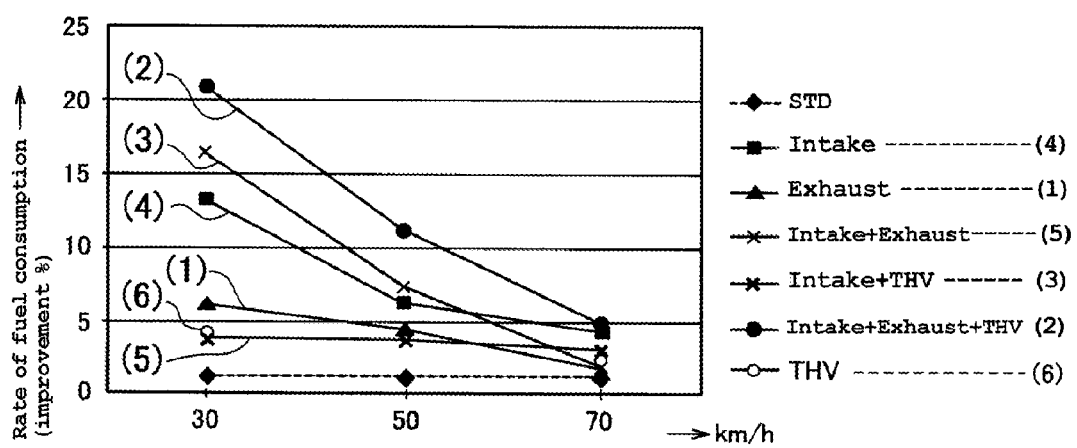
FIG. 14 is a graph for describing fuel consumption improvement effects in the respective embodiments according to the present invention.

FIG. 14 shows experimental results for describing fuel consumption improvement effects in the aforementioned cases (1) through (6). In this experiment, improvement effects of fuel consumption rates were investigated in cases that motorcycles with engine displacement of 125 cc, gas reserving chamber capacity of 30 cc and fresh air reserving chamber capacity of 30 cc run at 30, 50 and 70 km/h, relative to a comparative example vehicle having neither the gas reserving chamber nor the fresh air reserving chamber. In the aforementioned case (6), an experimental result of the situation in which the motorcycle run only at 30 km/h is indicated.

FIG. 14 reveals the fact that the fuel consumption rates in all of the cases (1) through (6) are improved than that of the comparative example vehicle. Particularly, in the cases (4), (3) and (2), the fuel consumption rates at 30 km/h were extremely improved by 13%, 16% and 21%, respectively, in comparison with that of the comparative example vehicle.

B. Another Modification

Figure 16:
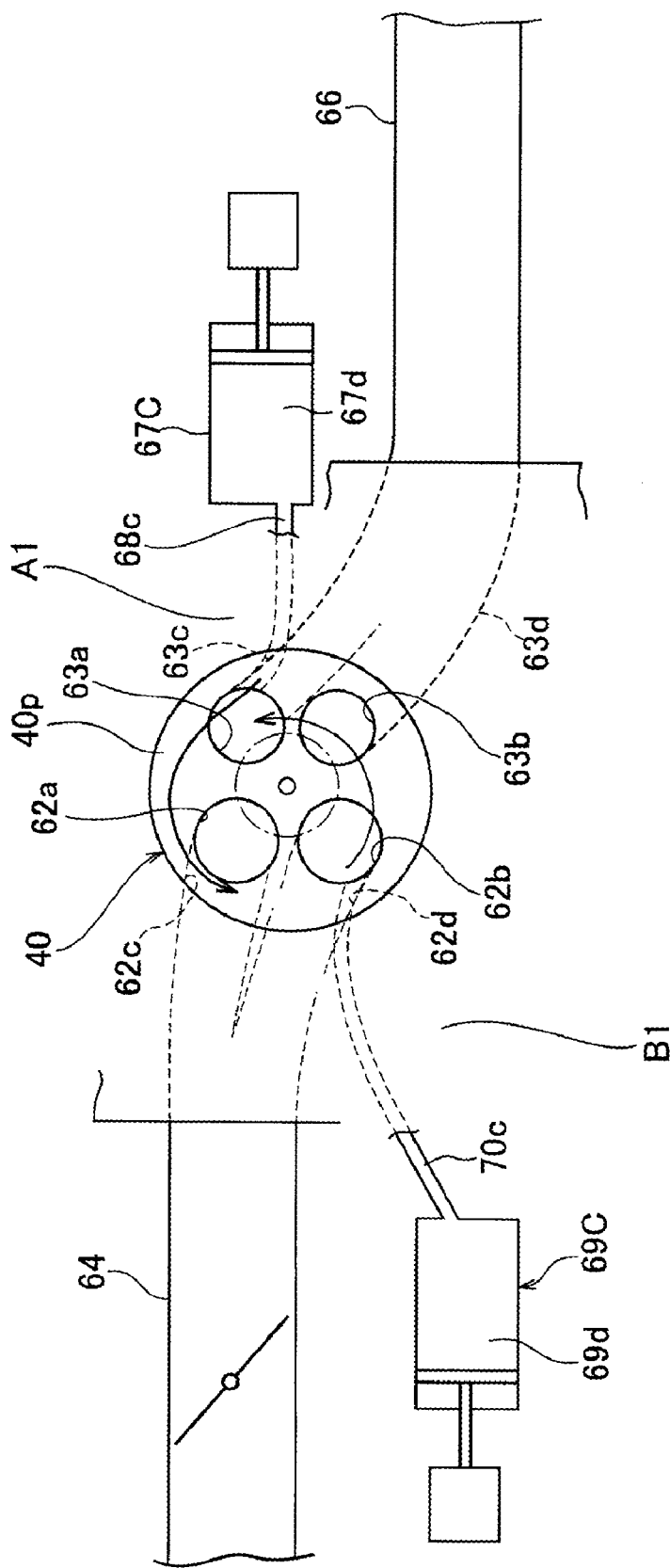
FIG. 16 is a schematic structural view of another modification of the second embodiment of the present invention.

In the following descriptions, with reference to FIG. 16, another modification of the second embodiment described above will be described. FIG. 16 is a schematic structural view of a four stroke internal combustion engine according to the another modification of the second embodiment of the present invention.

As shown in FIG. 16, the four stroke internal combustion engine has a combustion chamber 40 which is generally circularly shaped in a plan view, an intake conduit 64 through which fresh air to be introduced into the combustion chamber 40 flows, and an exhaust conduit 66 through which exhaust gas to be discharged from the combustion chamber 40 flows. Also, the intake conduit 64 has a branched intake port 62*c* and a branched intake port 62*d* both opening into the combustion chamber 40. The exhaust conduit 66 has a branched exhaust port 63*c* and a branched exhaust port 63*d* both opening into the combustion chamber 40.

The four stroke internal combustion engine has a gas reserving chamber 67C and a fresh air reserving chamber 69C. The gas reserving chamber 67C includes a gas reserving section 67*d* for reserving burned gas and a gas communicating passage 68*c* through which the gas reserving section 67*d* and the exhaust conduit 66 (branched exhaust port 63*c*) communicate with each other. The fresh air reserving chamber 69C includes a fresh air reserving section 69*d* for reserving fresh air and a fresh air communicating passage 70*c* through which the fresh air reserving section 69*d* and the intake conduit 64 (branched intake port 62*d*) communicate with each other. The burned gas in the combustion chamber 40 flows into the gas reserving section 67*d* of the gas reserving chamber 67C while the exhaust valve is opened in the expansion stroke or the exhaust stroke. On the other hand, the burned gas reserved in the gas reserving section 67*d* of the gas reserving chamber 67C is discharged to the combustion chamber 40 while the exhaust valve is opened in the intake stroke.

The fresh air reserved in the fresh air reserving section 69*d* of the fresh air reserving chamber 69C is introduced into the combustion chamber 40 while the intake valve is opened in the intake stroke.

At least a portion of the gas communicating passage 68*c* positioned closer to the exhaust conduit 66 (branched exhaust port 63*c*) is oriented in a preset rotational direction (counterclockwise direction) along the peripheral portion 40*p* of the combustion chamber 40. Also, at least a portion of the gas communicating passage 68*c* positioned closer to the exhaust conduit 66 (branched exhaust port 63*c*) extends along the exhaust conduit 66 (branched exhaust port 63*c*).

At least a portion of the fresh air communicating passage 70*c* positioned closer to the intake conduit 64 (branched intake port 62*d*) is oriented in a preset rotational direction (counterclockwise direction) along a concentric circle H formed closer to the center of the combustion chamber 40. Also, at least a portion of the fresh air communicating passage 70*c* positioned closer to the intake conduit 64 (branched intake port 62*d*) extends along the intake conduit 64 (branched intake port 62*d*).

It should be noted that the direction of the portion of the fresh air communicating passage 70*c* positioned closer to the intake conduit 64 (branched intake port 62*d*) is only required to be the same as the direction of the portion of the gas communicating passage 68*c* positioned closer to the exhaust conduit 66 (branched exhaust port 63*c*). For example, it can be configured, of course, such that both of the directions are oriented clockwise.

The exhaust conduit 66 curves in a plan view of the combustion chamber defining section (cylinder block and cylinder head). At least the portion of the gas reserving chamber 67C is placed in an area (area A1) positioned at the inner side of the exhaust conduit 66 that curves in the plan view of the combustion chamber defining section.

The intake conduit 64 curves in the plan view of the combustion chamber defining section (cylinder block and cylinder head). At least the portion of the fresh air reserving chamber 69C is placed in an area (area B1) positioned at the inner side of the intake conduit 64 that curves in the plan view of the combustion chamber defining section.

C. Functions and Effects

According to the four stroke internal combustion engine in this modified embodiment, as explained above, at least the portion of the gas communicating passage 68c positioned closer to the exhaust conduit 66 (branched exhaust port 63c) is oriented in the preset rotational direction (counterclockwise direction) along the peripheral portion 40p of the combustion chamber 40. Therefore, the burned gas discharged from the gas reserving chamber 67C into the combustion chamber 40 can generate a swirling flow along the peripheral portion 40p of the combustion chamber 40.

Also, as explained above, at least the portion of the gas communicating passage 68c positioned closer to the exhaust conduit 66 (branched exhaust port 63c) extends along the branched exhaust port 63c. Therefore, the burned gas is discharged to the combustion chamber 40 from the gas reserving chamber 67C without being blocked by the inner wall of the branched exhaust port 63c. Accordingly, the swirling flow along the peripheral portion 40p of the combustion chamber 40 can be efficiently generated.

Furthermore, according to the four stroke internal combustion engine in this modification, as explained above, at least the portion of the fresh air communicating passage 70c positioned closer to the intake conduit 64 (branched intake port 62d) is oriented in the preset rotational direction (counterclockwise direction) along the concentric circle H formed closer to the center of the combustion chamber 40. Therefore, the fresh air introduced into the combustion chamber 40 from the fresh air reserving chamber 69C can generate a swirling flow along the concentric circle H formed closer to the center of the combustion chamber 40.

Also, as explained above, at least the portion of the fresh air communicating passage 70c positioned closer to the intake conduit 64 (branched intake port 62d) extends along the branched intake port 62d. Therefore, the fresh air is introduced into the combustion chamber 40 from the fresh air reserving chamber 69C without being blocked by the inner wall of the branched intake port 62d. Accordingly, the swirling flow along the concentric circle H formed closer to the center of the combustion chamber 40 can be efficiently generated.

Furthermore, the direction of the portion of the fresh air communicating passage 70c positioned closer to the branched intake port 62d is the same as the direction of the portion of the gas communicating passage 68c positioned closer to the branched exhaust port 63c. Therefore, the swirling flow along the concentric circle H and the peripheral portion 40p can be efficiently generated.

Third Embodiment

In the following descriptions, with reference to drawings, a third embodiment of the present invention will be described. The following descriptions will be mainly directed to the differences between the aforementioned embodiments and the third embodiment.

Specifically, in the aforementioned embodiments, the gas reserving chamber for reserving exhaust gas is disposed outside the combustion chamber defining section (cylinder block and cylinder head) that forms the combustion chamber.

To the contrary, in the third embodiment, the gas reserving chamber for reserving burned gas is disposed in the combustion chamber defining section (cylinder block and cylinder head) that forms the combustion chamber.

Figure 17:
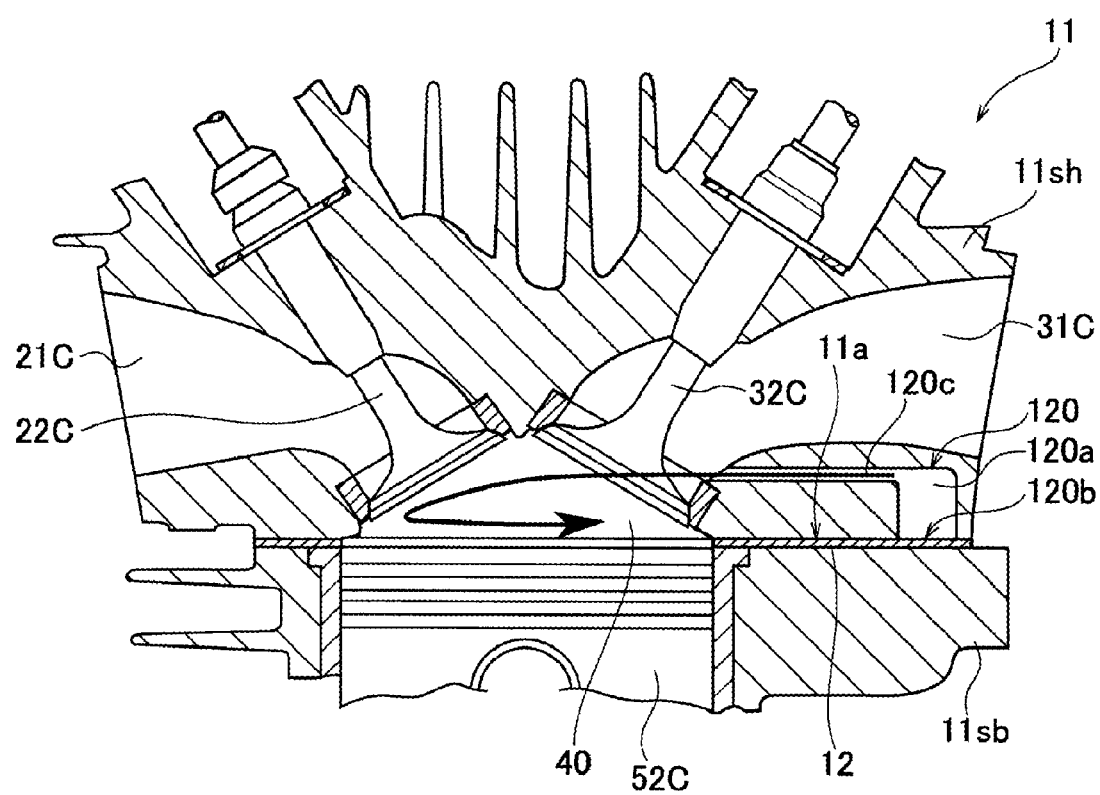
FIG. 17 is an enlarged cross-sectional view partially showing a four stroke internal combustion engine according to a third embodiment of the present invention.

FIG. 17 is a schematic structural view showing a four stroke internal combustion engine according to the third embodiment of the present invention.

As shown in FIG. 17, the four stroke internal combustion engine (engine 11) is equipped with a combustion chamber 40, a cylinder block 11sb containing a piston 52C, a cylinder head 11sh having a mating surface 11a which faces the cylinder block 11sb, an intake port 21C opening into the combustion chamber 40, an exhaust port 31C opening into the combustion chamber 40, an intake valve 22C for opening and closing a combustion chamber side opening of the intake port 21C, and an exhaust valve 32C for opening and closing a combustion chamber side opening of the exhaust port 31C. The intake port 21C and the exhaust port 31C are formed in the cylinder head 11sh.

The combustion chamber 40 is formed by coupling the cylinder block 11sb and the cylinder head 11sh via a gasket 12. In other words, the cylinder head 11sh and the cylinder block 11sb belong to the combustion chamber defining section that defines the combustion chamber 40.

Furthermore, the engine 11 is equipped with a gas reserving chamber 120. The gas reserving chamber 120 includes a gas reserving section 120a for reserving burned gas and a gas communicating passage section 120c through which the gas reserving section 120a and the exhaust port 31C communicate with each other.

The gas reserving section 120a and the gas communicating passage section 120c are formed in the cylinder head 11sh. The gas communicating passage section 120c is formed between the exhaust port 31C and the mating surface 11a. The gas reserving section 120a has an opening 120b (cylinder head opening) which opens into the mating surface 11a. The opening 120b is closed with the cylinder block 11sb and the cylinder head 11sh coupled via the gasket 12.

The burned gas flows into the gas reserving chamber 120 (gas reserving section 120a) while the exhaust valve 32C is opened in the expansion stroke or the exhaust stroke. The burned gas reserved in the gas reserving chamber 120 (gas reserving section 120a) is discharged to the combustion chamber 40 while the exhaust valve 32C is opened in the intake stroke.

The aforementioned fresh air reserving chamber (fresh air reserving chamber 69C) can be formed in the combustion chamber defining section (cylinder block 11sb and cylinder head 11sh) in the same manner as the gas reserving chamber 120.

A. Functions and Effects

In the four stroke internal combustion engine (engine 11) according to the third embodiment of the present invention, the gas reserving chamber 120 is formed in the combustion chamber defining section (cylinder block 11sb and the cylinder head 11sh). Therefore, the engine 11 can be downsized as compared with the case in which the gas reserving chamber 100 is provided outside the combustion chamber defining section, and the engine 11 can be easily assembled.

Furthermore, in the four stroke internal combustion engine (engine 11) according to the third embodiment of the present invention, the gas reserving section 120a is formed in the cylinder head 11sh and has the opening 120b that opens into the mating surface 11a. The opening 120b is closed with the cylinder block 11sb and the cylinder head 11sh coupled via the gasket 12. Therefore, the gas reserving section 120a can be formed by casting without any cutting work, resulting in easy production of the cylinder head 11sh.

Further, according to the four stroke internal combustion engine (engine 11) of the third embodiment of the present invention, the gas communicating passage section 120c is formed between the exhaust port 31C and the mating surface 11a, which makes it possible to form the gas reserving section 120a and the gas communicating passage section 120c while effectively using the limited space of the cylinder head 11sh.

Fourth Embodiment

In the following descriptions, with reference to drawings, a fourth embodiment of the present invention will be described. The following explanation will be mainly directed to the differences between the aforementioned embodiments and the fourth embodiment.

In the fourth embodiment, the gas reserving chamber for reserving burned gas is provided at the outer side of the combustion chamber defining section (cylinder block and cylinder head) that forms the combustion chamber.

Figure 18:
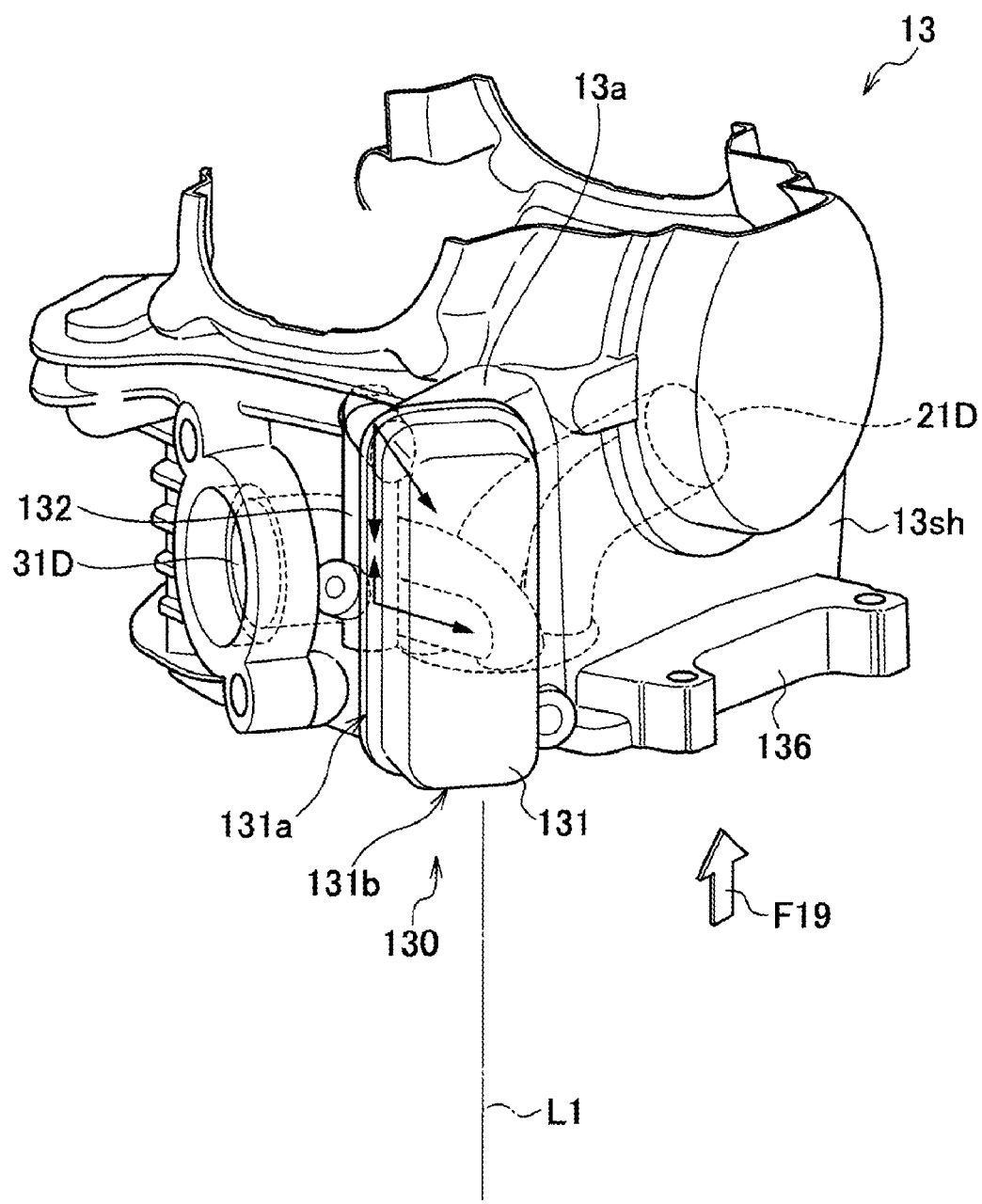
FIG. 18 is a schematic perspective view showing a part of a four stroke internal combustion engine according to a fourth embodiment of the present invention.
Figure 19:
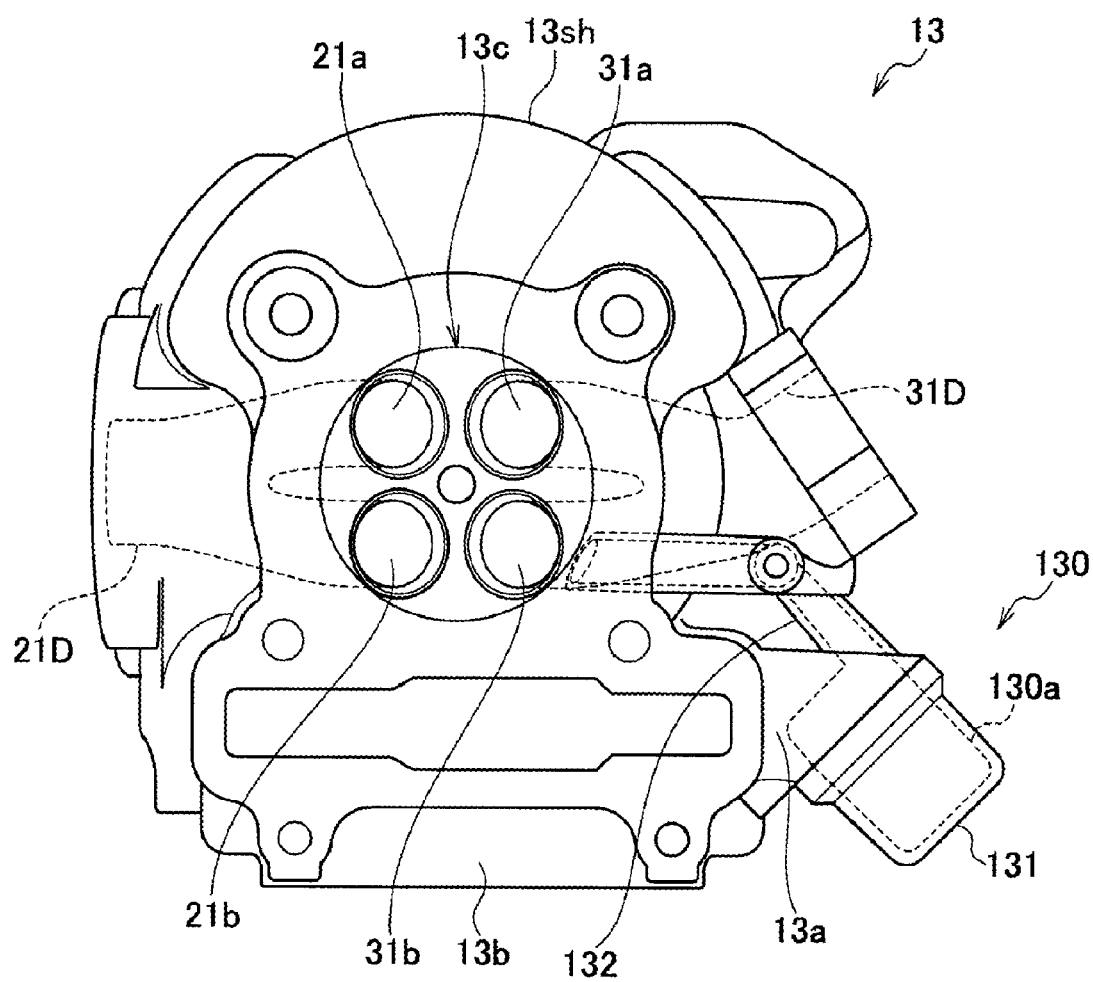
FIG. 19 is a bottom view of a cylinder head of the four stroke internal combustion engine as seen in the direction F19 indicated by the arrow in FIG. 18.

FIG. 18 is a schematic perspective view partially showing a four stroke internal combustion engine (engine 13) according to the fourth embodiment of the present invention. Specifically, FIG. 18 is a schematic perspective view of a cylinder head 13sh constituting an engine 13. FIG. 19 is a bottom view of the cylinder head 13sh as seen in the direction F19 indicated by an arrow in FIG. 18.

As shown in FIGS. 18 and 19, the engine 13 has an intake port 21D and an exhaust port 31D. The intake port 21D has intake port openings 21a and 21b opened and closed by intake valves (not shown). The exhaust port 31D has exhaust port openings 31a and 31b opened and closed by exhaust valves (not shown).

The cylinder head 13sh has a mounting portion 13b used for mounting the cylinder head 13sh on a cylinder block of the engine 13.

At the outside portion of the cylinder head 13sh (combustion chamber defining section), more specifically at the exhaust port 31D, a gas reserving chamber 130 is provided. The gas reserving chamber 130 is protruded from the outside portion of the cylinder head 13sh. Specifically, the gas reserving chamber 130 is protruded in the tangential direction of a cylinder 13c (see FIG. 19). It should be noted that in FIG. 19, the reference numeral "13c" designates a combustion chamber of the cylinder head 13sh, which is, in fact, coupled with a cylinder (not shown).

The gas reserving chamber 130 includes a proximal part 13a provided at the outside portion of the cylinder head 13sh, and a cover 131 for closing the proximal part 13a. The cover 131 is fixed to the proximal part 13a with bolts (not shown).

In this embodiment, the gas reserving chamber 130 has a rectangular parallelepiped shape. Specifically, in the gas reserving chamber 130, a side 131a extending along an axis L1 of the cylinder (not shown) is longer than a side 131b perpendicular to the axis L1.

The proximal part 13a is protruded from the cylinder head 13sh and is integrally formed with the cylinder head 13sh. In the proximal part 13a and the cover 131, a gas reserving section 130a for reserving burned gas is formed.

To the proximal part 13a, a gas communicating passage section 132 is secured. The burned gas reserved in the gas reserving chamber 130 is discharged to the exhaust port 31D through the gas communicating passage section 132 (see the arrow indicated in the gas communicating passage section 132).

A. Functions and Effects

In the four stroke internal combustion engine (engine 13) according to the fourth embodiment of the present invention, the gas reserving chamber 130 is provided at the outside of the cylinder head 13sh and the gas reserving chamber 130 is protruded from the outside of the cylinder head 13sh. Furthermore, the gas reserving chamber has a rectangular parallelepiped shape, and the side 131a along the axis L1 of the cylinder (not shown) is longer than the side 131b perpendicular to the axis L1.

As a result, even in cases where it is difficult to provide a gas reserving chamber having an enough capacity in the cylinder head as in the third embodiment, it is possible to downsize the engine 13 while securing sufficient capacity of the gas reserving chamber 130.

In this embodiment, within the proximal part 13a, the gas reserving section 130a for reserving burned gas is formed, and the proximal part 13a is closed by the cover 131. This allows easier maintenance of the inside of the gas reserving section 130a.

Furthermore, in this embodiment, the gas reserving section 130a is also formed at the inside of the cover 131. Therefore, the capacity of the gas reserving section 130a can be readily increased by the cover 131. Furthermore, changing the size of the cover 131 allows an easy change in capacity of the gas reserving section 130a.

Other Embodiments

Although contents of the present invention are disclosed through the aforementioned embodiments of the present invention, it should not be understood that the descriptions and drawings, as a part of the disclosure, limit the present invention. Based on the disclosure, various modifications will be apparent from a person skilled in the art.

For example, it can be configured such that characteristic portions of the aforementioned embodiments and modifications thereof are properly combined to provide a four stroke internal combustion engine.

In some examples, it can be configured such that, as shown in the modification of the second embodiment, the exhaust passage (exhaust conduit 66) is curved in the plan view of the combustion chamber defining section (cylinder block and cylinder head), at least a portion of the gas reserving chamber (gas reserving chamber 67C) is positioned in the area (area A1) inner than the curved exhaust passage (exhaust conduit 66) in the plan view of the combustion chamber defining section, and that, as shown in the third embodiment, the gas reserving chamber (gas reserving chamber 120) is positioned in the combustion chamber defining section (particularly, cylinder head 11sh).

In this configuration, since at least a part of the gas reserving chamber is positioned in the area A1 inner than the curved exhaust passage and the gas reserving chamber is positioned in the cylinder head, the gas reserving chamber can be formed by effectively using the limited space of the cylinder head.

Furthermore, it can be configured such that, as shown in the modification of the second embodiment, the intake passage (intake conduit 64) is curved in the plan view of the combustion chamber defining section (cylinder block and cylinder head), and at least a portion of the fresh air reserving chamber (fresh air reserving chamber 69C) is positioned at the area (area B1) inner than the curved intake passage (intake conduit 64) in the plan view of the combustion chamber defining section, and that the fresh air reserving chamber is positioned in the combustion chamber defining section (cylinder block 11sb and cylinder head 11sh).

Furthermore, in the third embodiment described above, although the gas reserving section 120a is formed in the cylinder head 11sh and has the opening 120b which opens into the mating surface 11a, the gas reserving section 120a, however, is not limited to such a structure and does not necessarily have the opening 120b which opens into the mating surface 11a.

Figure 20:
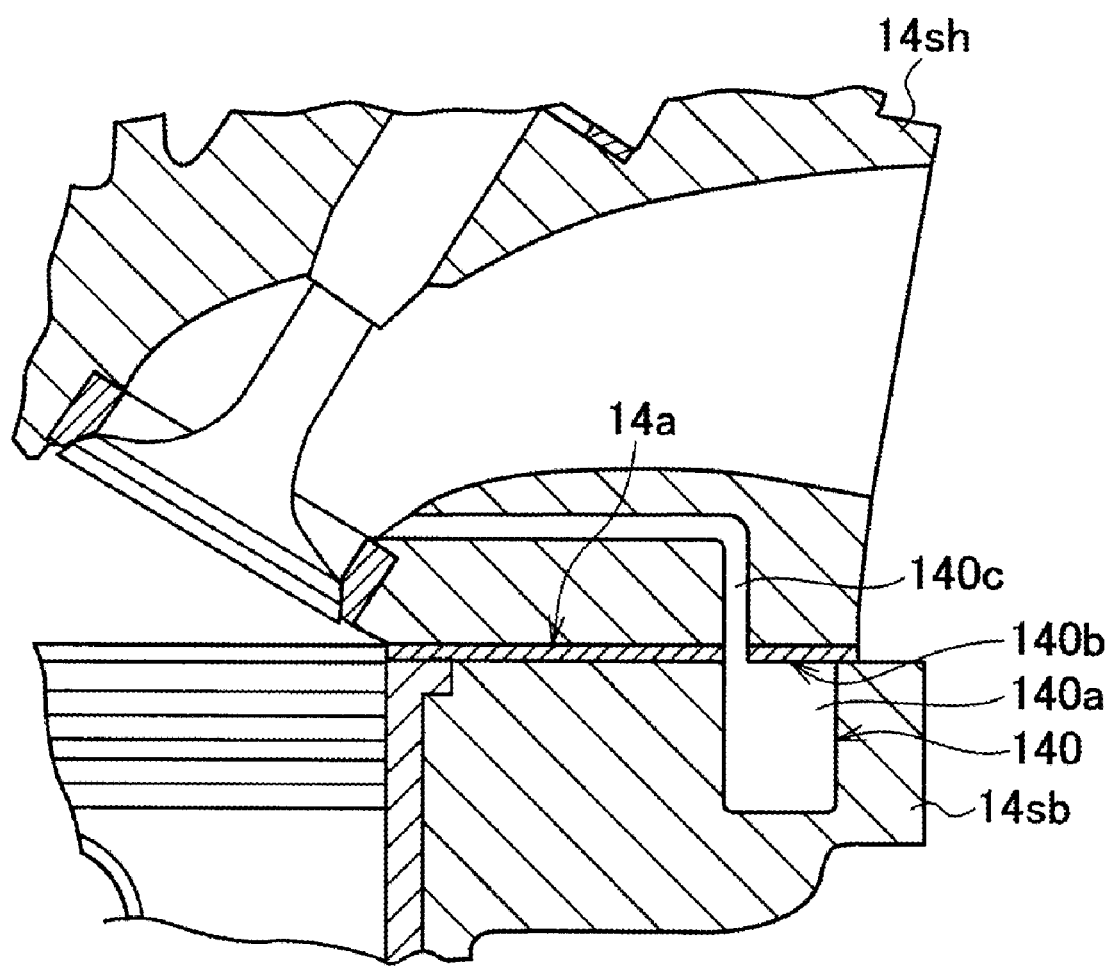
FIG. 20 is an enlarged cross-sectional view partially showing a four stroke internal combustion engine according to a modification of the third embodiment of the present invention.
Figure 21:
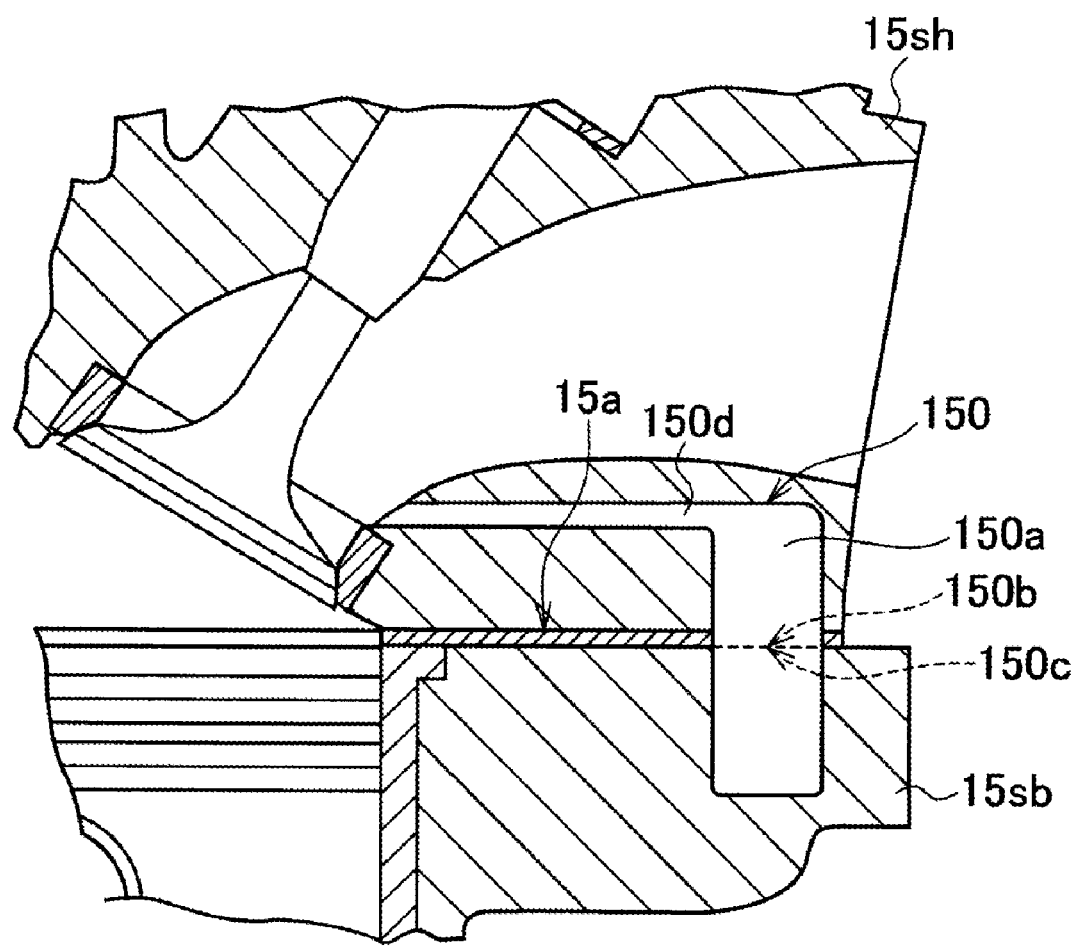
FIG. 21 is an enlarged cross-sectional view partially showing a four stroke internal combustion engine according to another modification of the third embodiment of the present invention.

For example, the shape of the gas reserving section can be modified as described below. FIGS. 20 and 21 illustrate modifications of the gas reserving section.

FIG. 20 is an enlarged cross-sectional view partially showing a cylinder head 14sh and a cylinder block 14sb according to a modification of the third embodiment of the present invention. As shown in FIG. 20, this gas reserving chamber 140 is formed by a gas reserving section 140a and a gas communicating passage section 140c. The gas reserving section 140a is formed not in the cylinder head 14sh but in the cylinder block 14sb.

The gas reserving section 140a has an opening 140b (cylinder block opening) which opens into a mating surface 14a. In this modification shown in FIG. 20, the opening 140b is closed by coupling the cylinder block 14sb and the cylinder head 14sh.

FIG. 21 is an enlarged cross-sectional view partially showing a cylinder head 15sh and a cylinder block 15sb according to another modification of the third embodiment of the present invention. As shown in FIG. 21, this gas reserving chamber 150 is formed by a gas reserving section 150a and a gas communicating passage section 150d. The gas reserving section 150a is formed in the cylinder head 15sh and the cylinder block 15sb.

One half of the gas reserving section 150a formed in the cylinder head 15sh has a cylinder head opening 150b which opens into a mating surface 15a. On the other hand, the other half of the gas reserving section 150a formed in the cylinder block 15sb has a cylinder block opening 150c which opens into the cylinder head 15sh.

In the modification shown in FIG. 21, coupling the cylinder block 15sb and the cylinder head 15sh allows communication between the cylinder head opening 150b and the cylinder block opening 150c.

As thus described, it should be understood that the present invention includes various other embodiments not described herein. Accordingly, the technical scope of the present invention is decided only by the invention specifying items according to the claims that are proper in light of the above descriptions.

INDUSTRIAL APPLICABILITY

The four stroke internal combustion engine according to the present invention can be preferably applied to various types of internal combustion engines, such as engines, since it can decrease emission of nitrogen oxides (NOx) while improving fuel consumption and without complicating the structure of the cylinder head part.

BROAD SCOPE OF THE INVENTION

While illustrative embodiments of the invention have been described herein, the present invention is not limited to the various preferred embodiments described herein, but includes any and all embodiments having equivalent elements, modifications, omissions, combinations (e.g., of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably, but not limited to." In this disclosure and during the prosecution of this application, means-plus-function or step-plus-function limitations will only be employed where for a specific claim limitation all of the following conditions are present in that limitation: a) "means for" or "step for" is expressly recited; b) a corresponding function is expressly recited; and c) structure, material or acts that support that structure are not recited. In this disclosure and during the prosecution of this application, the terminology "present invention" or "invention" is meant as an non-specific, general reference and may be used as a reference to one or more aspect within the present disclosure. The language present invention or invention should not be improperly interpreted as an identification of criticality, should not be improperly interpreted as applying across all aspects or embodiments (i.e., it should be understood that the present invention has a number of aspects and embodiments), and should not be improperly interpreted as limiting the scope of the application or claims. In this disclosure and during the prosecution of this application, the terminology "embodiment" can be used to describe any aspect, feature, process or step, any combination thereof, and/or any portion thereof, etc. In some examples, various embodiments may include overlapping features. In this disclosure and during the prosecution of this case, the following abbreviated terminology may be employed: "e.g." which means "for example."

What is claimed is:

1. A four stroke internal combustion engine, comprising:
   a combustion chamber;
   a combustion chamber defining section which defines the combustion chamber;
   an intake passage which opens into the combustion chamber;
   an exhaust passage which opens into the combustion chamber;
   an intake valve which opens and closes a combustion chamber side opening of the intake passage; and
   an exhaust valve which opens and closes a combustion chamber side opening of the exhaust passage,
   wherein the combustion chamber defining section has a gas reserving chamber which communicates with the exhaust passage and is configured to reserve burned gas discharged from the combustion chamber;
   wherein the burned gas flows into the gas reserving chamber while the exhaust valve is opened in an expansion stroke or an exhaust stroke; and
   wherein the burned gas reserved in the gas reserving chamber is discharged to the combustion chamber while the exhaust valve is opened in an intake stroke.

2. The four stroke internal combustion engine as recited in claim 1,
   wherein the gas reserving chamber includes a gas reserving section for reserving the burned gas and a gas communicating passage section through which the gas reserving section and the exhaust passage communicate with each other, wherein the combustion chamber defining section includes a cylinder block and a cylinder head having a mating surface which faces the cylinder block, wherein the gas reserving section is formed in the cylinder head and has a cylinder head opening which opens into the mating surface, and wherein the cylinder block and the cylinder head are coupled with each other to close the cylinder head opening.

3. The four stroke internal combustion engine as recited in claim 1, wherein the gas reserving chamber includes a gas reserving section for reserving the burned gas and a gas communicating passage section through which the gas reserving section and the exhaust passage communicate with each other, wherein the combustion chamber defining section includes a cylinder block and a cylinder head having a mating surface which faces the cylinder block, wherein the gas reserving section is formed in the cylinder block and has a cylinder block opening which opens into the mating surface, wherein the cylinder block and the cylinder head are coupled with each other to close the cylinder block opening.

4. The four stroke internal combustion engine as recited in claim 1, wherein the gas reserving chamber includes a gas reserving section for reserving the burned gas and a gas communicating passage section through which the gas reserving section and the exhaust passage communicate with each other, wherein the combustion chamber defining section includes a cylinder block and a cylinder head having a mating surface which faces the cylinder block, wherein the gas reserving section is formed in the cylinder head and the cylinder block, wherein a part of the gas reserving section formed in the cylinder head has a cylinder head opening which opens into the mating surface, wherein the other part of the gas reserving section formed in the cylinder block has a cylinder block opening which opens into the cylinder head, and wherein the cylinder head and the cylinder block are coupled with each other to communicate the cylinder head opening and the cylinder block opening.

5. The four stroke internal combustion engine as recited in claim 2, wherein the exhaust passage is formed in the cylinder head, and wherein the gas communicating passage section is formed between the exhaust passage and the mating surface.

6. The four stroke internal combustion engine as recited in claim 3, wherein the exhaust passage is formed in the cylinder head, and wherein the gas communicating passage section is formed between the exhaust passage and the mating surface.

7. The four stroke internal combustion engine as recited in claim 4, wherein the exhaust passage is formed in the cylinder head, and wherein the gas communicating passage section is formed between the exhaust passage and the mating surface.

8. The four stroke internal combustion engine as recited in claim 2, wherein the combustion chamber has a generally circular shape in a plan view, and wherein at least a portion of the gas communicating passage section positioned at a side of the exhaust passage is oriented in a preset rotational direction along a peripheral portion of the combustion chamber.

9. The four stroke internal combustion engine as recited in claim 3, wherein the combustion chamber has a generally circular shape in a plan view, and wherein at least a portion of the gas communicating passage section positioned at a side of the exhaust passage is oriented in a preset rotational direction along a peripheral portion of the combustion chamber.

10. The four stroke internal combustion engine as recited in claim 4, wherein the combustion chamber has a generally circular shape in a plan view, and wherein at least a portion of the gas communicating passage section positioned at a side of the exhaust passage is oriented in a preset rotational direction along a peripheral portion of the combustion chamber.

11. The four stroke internal combustion engine as recited in claim 2, wherein at least a portion of the gas communicating passage section positioned at a side of the exhaust passage extends along the exhaust passage.

12. The four stroke internal combustion engine as recited in claim 3, wherein at least a portion of the gas communicating passage section positioned at a side of the exhaust passage extends along the exhaust passage.

13. The four stroke internal combustion engine as recited in claim 4, wherein at least a portion of the gas communicating passage section positioned at a side of the exhaust passage extends along the exhaust passage.

14. The four stroke internal combustion engine as recited in claim 1, wherein the exhaust passage is curved in a plan view of the combustion chamber defining section, and wherein at least a portion of the gas reserving chamber is positioned in an area inner than the curved exhaust passage in the plan view of the combustion chamber defining section.

15. The four stroke internal combustion engine as recited in claim 1, wherein the gas reserving chamber is provided at an outer side portion of the combustion chamber defining section.

16. The four stroke internal combustion engine as recited in claim 15, wherein the gas reserving chamber is protruded from the outer side portion.

17. The four stroke internal combustion engine as recited in claim 16, wherein the gas reserving chamber includes a proximal part provided at the outer side portion and a cover for closing the proximal part, and wherein a gas reserving section for reserving the burned gas is formed in the proximal part.

18. The four stroke internal combustion engine as recited in claim 16, wherein a gas reserving section for reserving the burned gas is formed in the cover.

19. The four stroke internal combustion engine as recited in claim 18,
wherein the gas reserving chamber has a rectangular parallelepiped shape.

20. A four stroke internal combustion engine, comprising:
a combustion chamber;
an intake passage which opens into the combustion chamber;
an exhaust passage which opens into the combustion chamber;
an intake valve which opens and closes a combustion chamber side opening of the intake passage;
an exhaust valve which opens and closes a combustion chamber side opening of the exhaust passage;
a gas reserving chamber which communicates with the exhaust passage and is configured to reserve burned gas discharged from the combustion chamber; and
means for flowing burned gas into the gas reserving chamber while the exhaust valve is opened in an expansion stroke or an exhaust stroke and for discharging burned gas reserved in the gas reserving chamber to the combustion chamber while the exhaust valve is opened in an intake stroke.

* * * * *